US010243476B2

(12) United States Patent
Narita et al.

(10) Patent No.: US 10,243,476 B2
(45) Date of Patent: Mar. 26, 2019

(54) POWER CONVERSION DEVICE AND POWER CONVERSION METHOD

(71) Applicant: Kabushiki Kaisha Yaskawa Denki, Kitakyushu-shi (JP)

(72) Inventors: Tetsumi Narita, Kitakyushu (JP); Sadao Ishii, Kitakyushu (JP); Takashi Kuboyama, Kitakyushu (JP); Shinsuke Kajiwara, Kitakyushu (JP)

(73) Assignee: KABUSHIKI KAISHA YASKAWA DENKI, Kitakyushu-shi (JP)

( * ) Notice: Subject to any disclaimer, the term of this patent is extended or adjusted under 35 U.S.C. 154(b) by 0 days.

(21) Appl. No.: 15/384,840

(22) Filed: Dec. 20, 2016

(65) Prior Publication Data

US 2017/0187297 A1  Jun. 29, 2017

(30) Foreign Application Priority Data

Dec. 24, 2015 (JP) ................................ 2015-251063
Sep. 30, 2016 (JP) ................................ 2016-195002

(51) Int. Cl.
*H02M 3/337* (2006.01)
*H02M 1/00* (2006.01)

(52) U.S. Cl.
CPC .. *H02M 3/3376* (2013.01); *H02M 2001/0009* (2013.01); *H02M 2001/0048* (2013.01); *Y02B 70/1491* (2013.01)

(58) Field of Classification Search
CPC ...... H02M 3/33546; H02M 1/08; H02M 1/36; H02M 2001/0009; H02M 3/3376; H02M 2001/0048; Y02B 70/1491

(Continued)

(56) References Cited

U.S. PATENT DOCUMENTS 6,369,651 B1 * 4/2002 Dent .................... H02M 3/1582
330/127
6,483,723 B2 * 11/2002 Kuranuki ................ H02M 1/34
363/132

(Continued)

FOREIGN PATENT DOCUMENTS

EP  1 003 272 A2  5/2000
JP  2000-156978 A  6/2000

OTHER PUBLICATIONS

Received STIC search report from EIC 2800 searcher Mesfin Getaneh on Jun. 12, 2017.*

(Continued)

*Primary Examiner* — Timothy J Dole
*Assistant Examiner* — Htet Z Kyaw
(74) *Attorney, Agent, or Firm* — Oblon, McClelland, Maier & Neustadt, L.L.P.

(57) ABSTRACT

A power conversion device includes a switching circuit and a switch driver. The switching circuit includes a plurality of switching elements including a first switching element and a second switching element that are electrically coupled in series. The switch driver includes a first, a second, and a third switching pattern controller. The first switching pattern controller executes a first switching pattern which is set such that a current in a reverse direction flows through the first switching element and the second switching element is off. The second switching pattern controller executes a second switching pattern which is set such that a direction of the current flowing through the first switching element is switched to a forward direction from the reverse direction. The third switching pattern controller executes a third switching pattern which is set such that the first switching element is off and the second switching element is on.

20 Claims, 20 Drawing Sheets

(58) Field of Classification Search
USPC .................................. 363/16, 17, 56, 2, 3
See application file for complete search history.

(56) References Cited

U.S. PATENT DOCUMENTS

| | | | | |
|---|---|---|---|---|
| 6,937,483 B2* | 8/2005 | Zhu | ................... | H02M 3/33576 363/17 |
| 7,177,163 B2* | 2/2007 | Eguchi | .............. | H02M 3/33592 363/132 |
| 8,471,518 B2* | 6/2013 | Nishiguchi | ........... | B60L 11/123 318/800 |
| 9,270,187 B2* | 2/2016 | Takagi | .............. | H02M 3/33584 |
| 9,270,189 B2* | 2/2016 | Rosado | ............ | H02M 3/33584 |
| 9,627,979 B2* | 4/2017 | Safaee | .............. | H02M 3/33507 |
| 9,748,853 B1* | 8/2017 | Li | ........................ | H02J 7/0052 |
| 2001/0030581 A1* | 10/2001 | Dent | ................... | H02M 3/1582 330/297 |
| 2002/0075698 A1* | 6/2002 | Kuranuki | ................ | H02M 1/34 363/17 |
| 2003/0198064 A1* | 10/2003 | Zhu | ................... | H02M 3/33576 363/21.01 |
| 2009/0206812 A1* | 8/2009 | Sasaya | ................ | H02M 3/1588 323/282 |
| 2011/0193509 A1* | 8/2011 | Ooyama | ................ | H02M 1/12 318/503 |
| 2011/0249472 A1* | 10/2011 | Jain | ................... | H02M 3/33584 363/15 |
| 2012/0014138 A1* | 1/2012 | Ngo | ................. | H02M 3/33584 363/17 |
| 2012/0091933 A1* | 4/2012 | Inamura | .................... | B60L 7/06 318/400.3 |
| 2013/0033205 A1* | 2/2013 | Furukawa | ........... | H02P 21/0003 318/400.02 |
| 2014/0049198 A1* | 2/2014 | Ooyama | ................. | H02M 1/12 318/400.09 |
| 2014/0091324 A1* | 4/2014 | Zushi | ...................... | H02M 1/08 257/77 |
| 2014/0226369 A1* | 8/2014 | Kimura | ............... | H02M 3/3376 363/21.09 |
| 2015/0131330 A1* | 5/2015 | Pan | ......................... | H02M 3/07 363/17 |
| 2015/0162850 A1* | 6/2015 | Banno | ................. | H02M 5/4585 307/52 |
| 2015/0365005 A1* | 12/2015 | Panov | ............ | H02M 3/33584 307/24 |
| 2016/0139651 A1* | 5/2016 | Schramm | ............. | G06F 1/3287 713/323 |
| 2016/0211690 A1* | 7/2016 | Li | .......................... | H02J 7/0052 |
| 2016/0308524 A1* | 10/2016 | Inoue | ..................... | H02M 1/08 |
| 2016/0352236 A1* | 12/2016 | Yoo | .................... | H02M 3/33584 |
| 2017/0155342 A1* | 6/2017 | Deboy | .............. | H02M 7/53871 |
| 2017/0229994 A1* | 8/2017 | Sawamura | .............. | H02M 7/06 |

OTHER PUBLICATIONS

Office Action dated Apr. 10, 2017 in Japanese Patent Application No. 2016-195002.

* cited by examiner

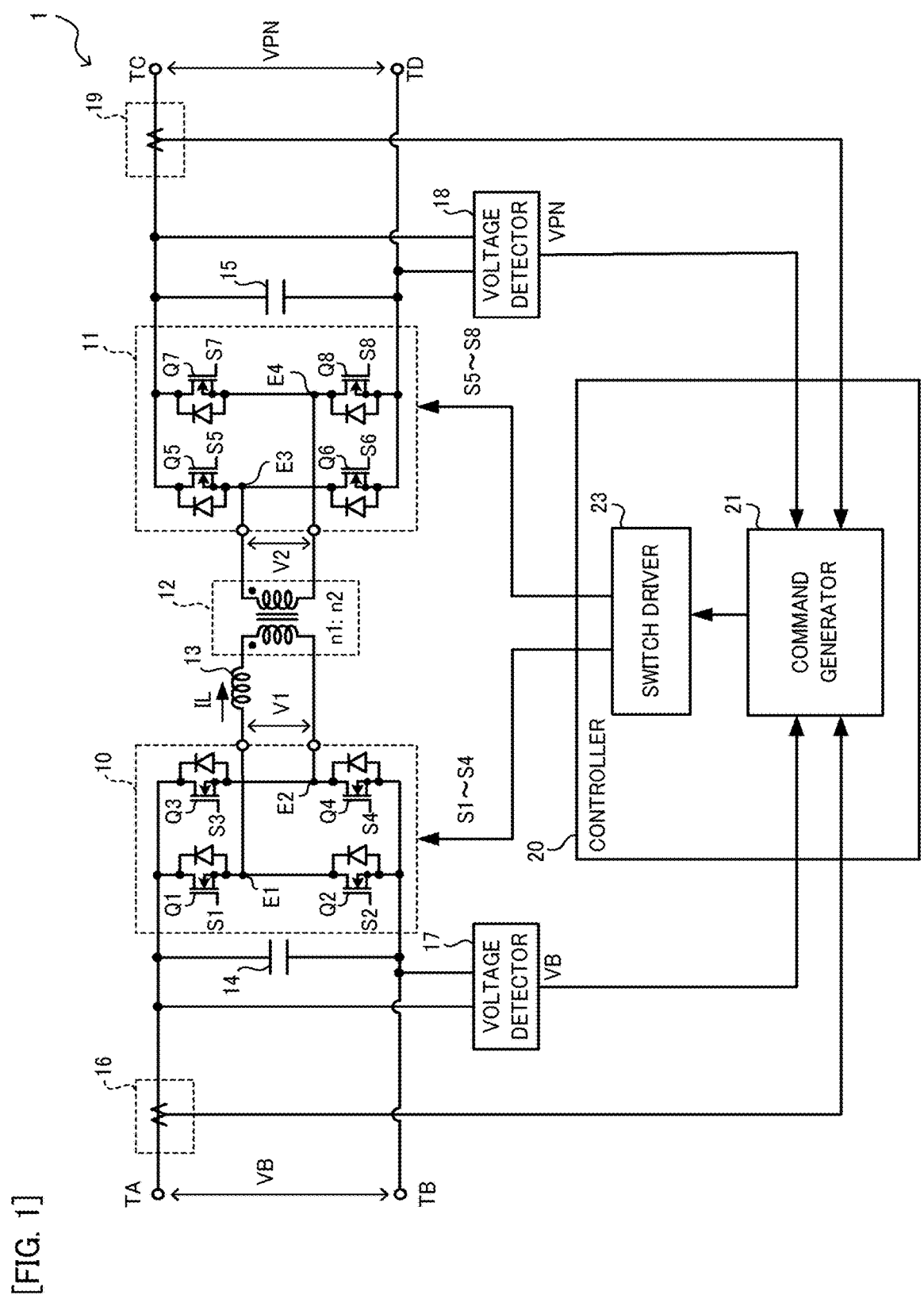
[FIG. 1]

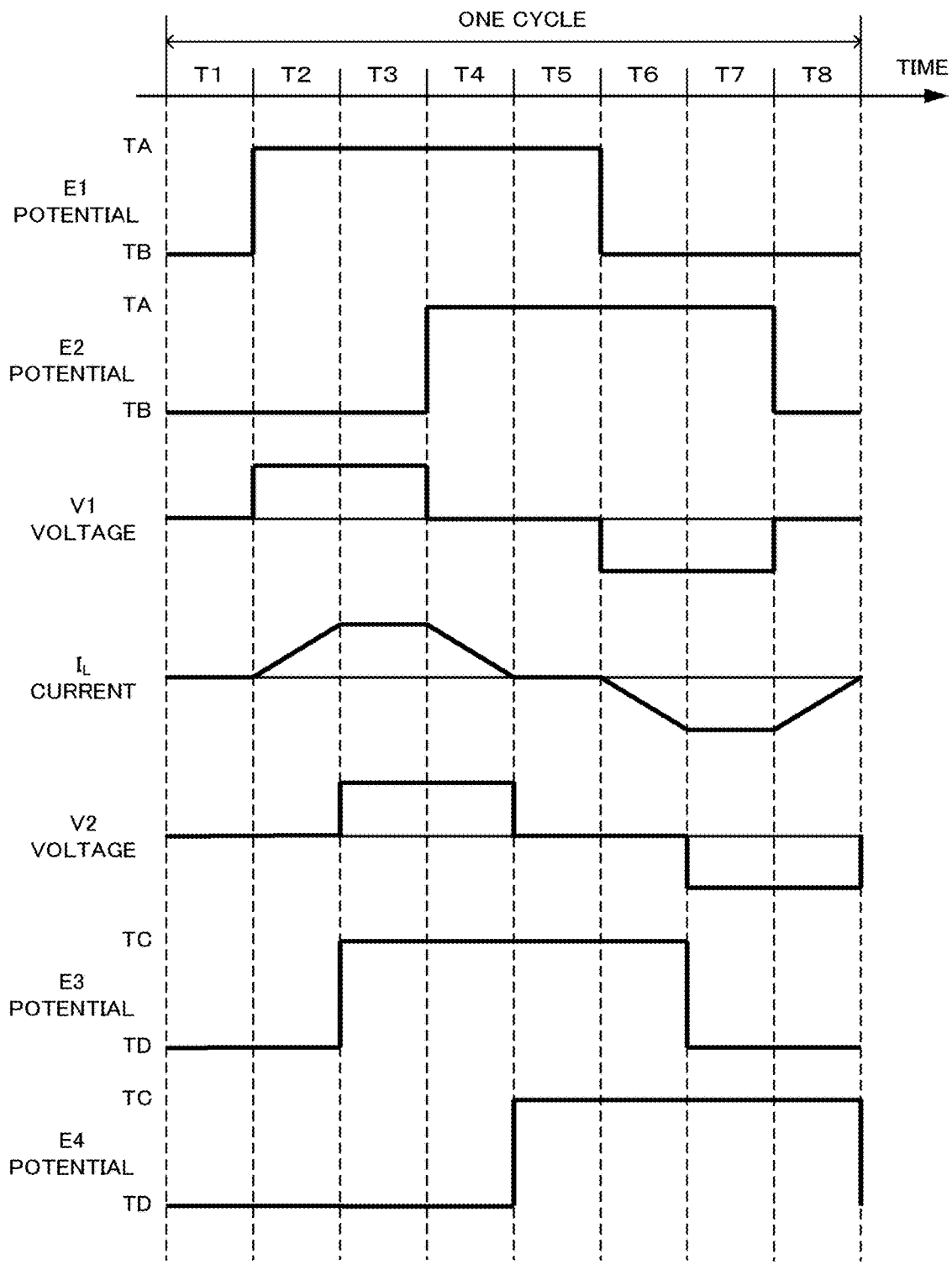

[FIG. 3]

| OPERATION SWITCHING PATTERN OF COMPARATIVE EXAMPLE | | | | | | | | |
|---|---|---|---|---|---|---|---|---|
|  | T1 | T2 | T3 | T4 | T5 | T6 | T7 | T8 |
| Q1 | 0 | 1 | 1 | 1 | 1 | 0 | 0 | 0 |
| Q2 | 1 | 0 | 0 | 0 | 0 | 1 | 1 | 1 |
| Q3 | 0 | 0 | 0 | 1 | 1 | 1 | 1 | 0 |
| Q4 | 1 | 1 | 1 | 0 | 0 | 0 | 0 | 1 |
| Q5 | 0 | 0 | 1 | 1 | 1 | 1 | 0 | 0 |
| Q6 | 1 | 1 | 0 | 0 | 0 | 0 | 1 | 1 |
| Q7 | 0 | 0 | 0 | 0 | 1 | 1 | 1 | 1 |
| Q8 | 1 | 1 | 1 | 1 | 0 | 0 | 0 | 0 |

ELEMENT CURRENT DIRECTION
( ): FORWARD DIRECTION, ▨: REVERSE DIRECTION

SWITCHING STATE (0: OFF, 1: ON)

[FIG. 4]
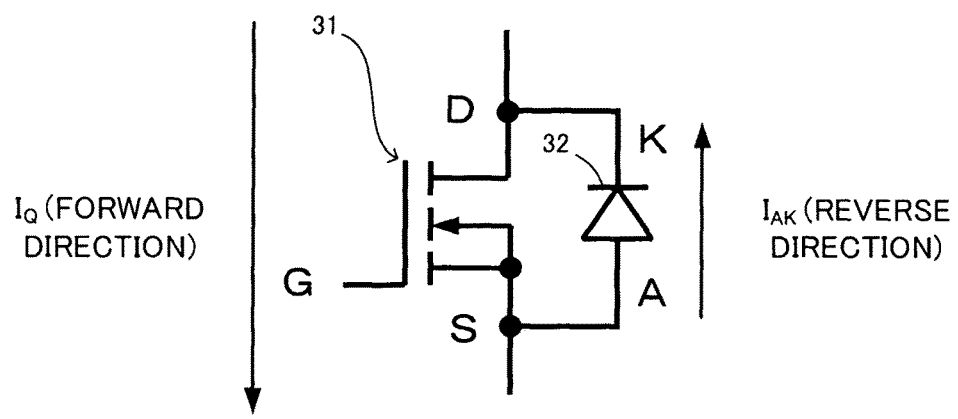
[FIG. 5]
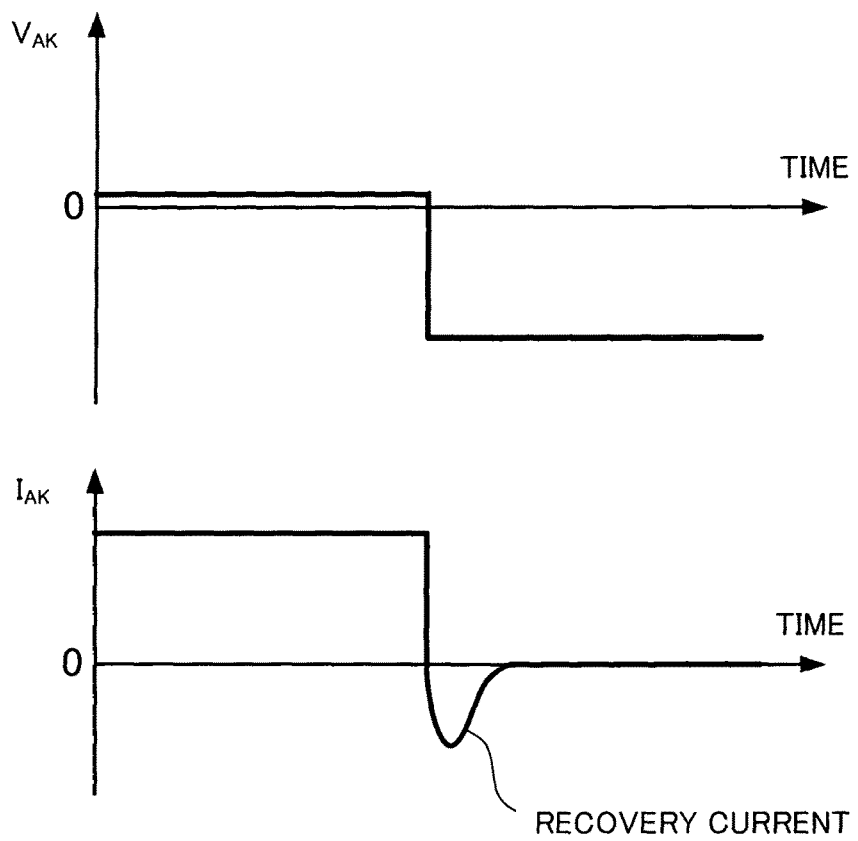

[FIG. 6]
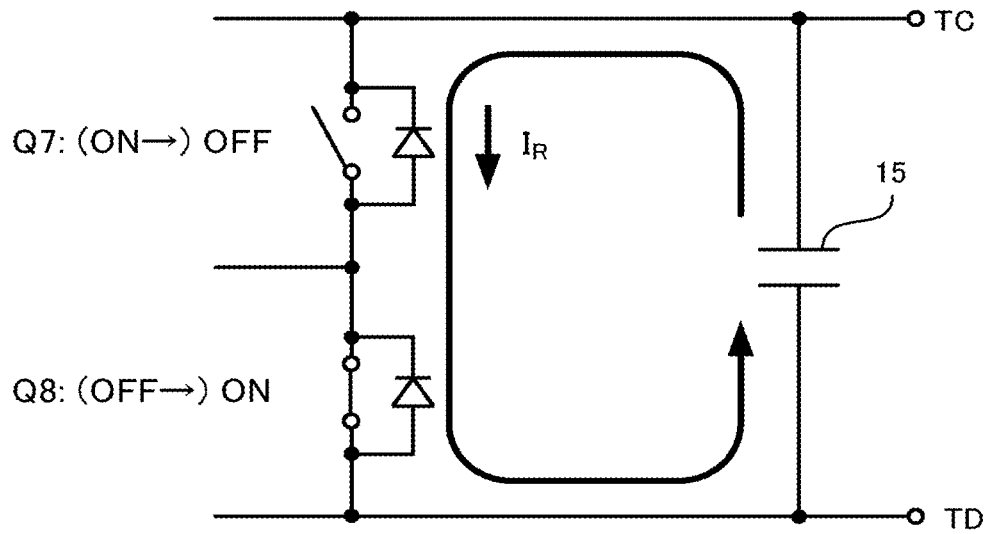
[FIG. 7]
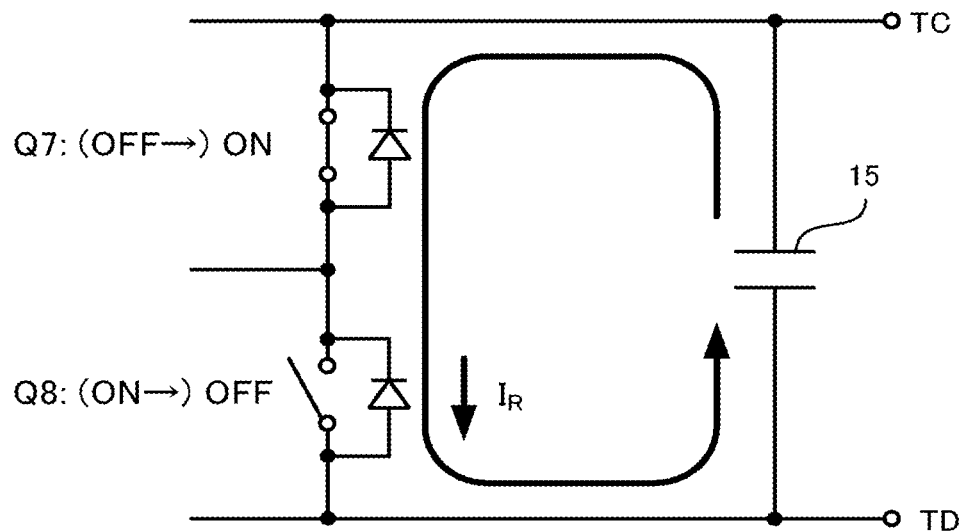

[FIG. 8]
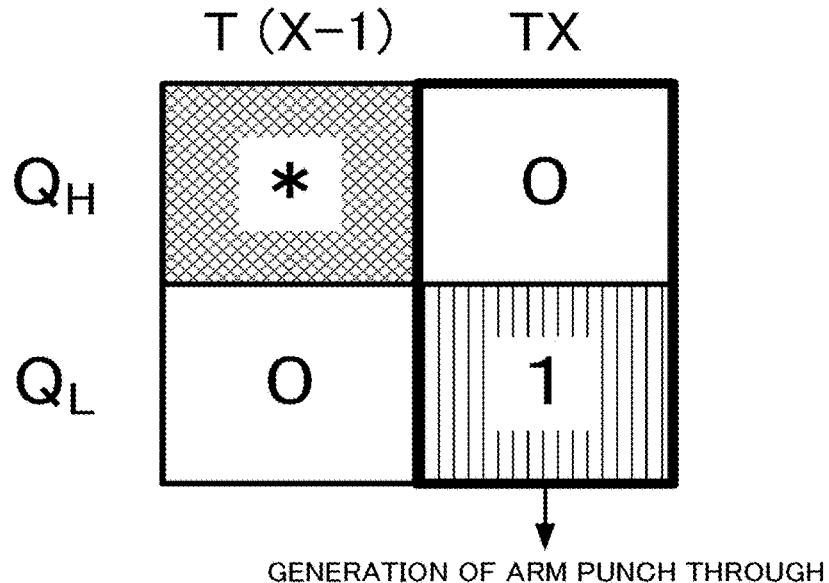
[FIG. 9]
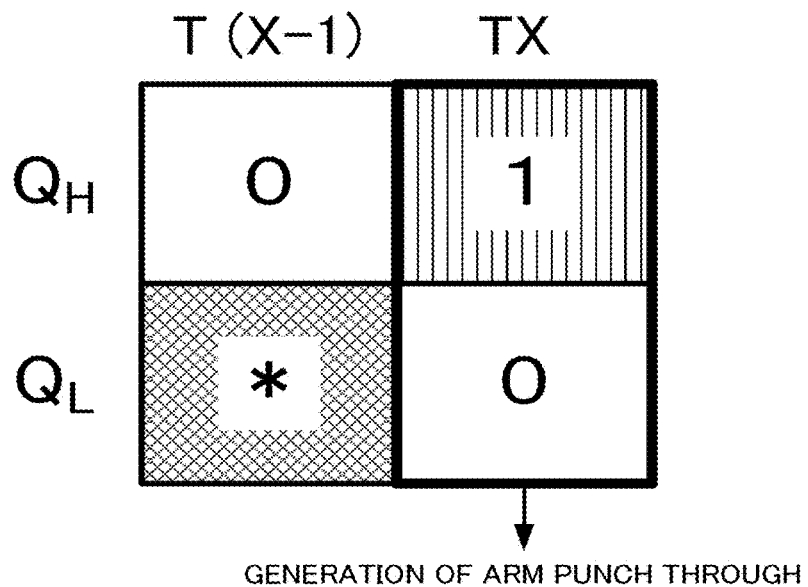

[FIG. 10]
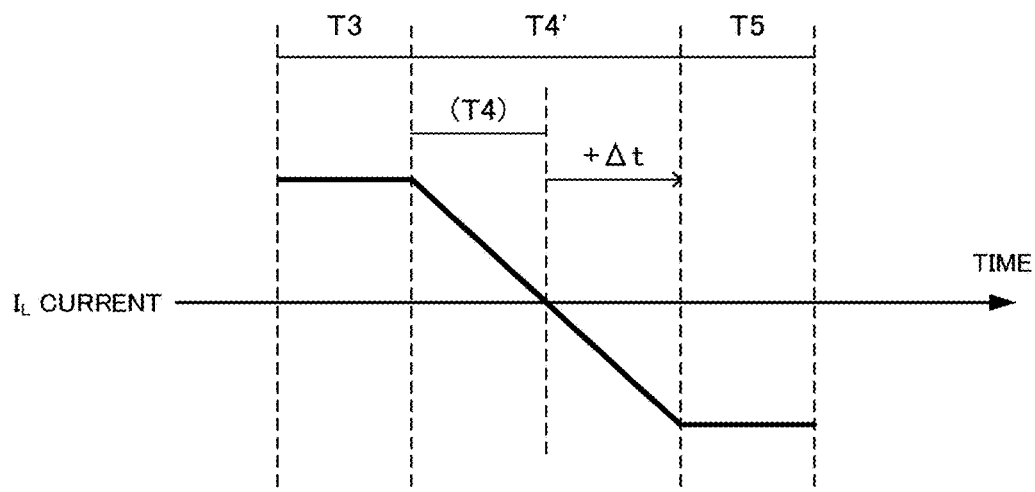
[FIG. 11]
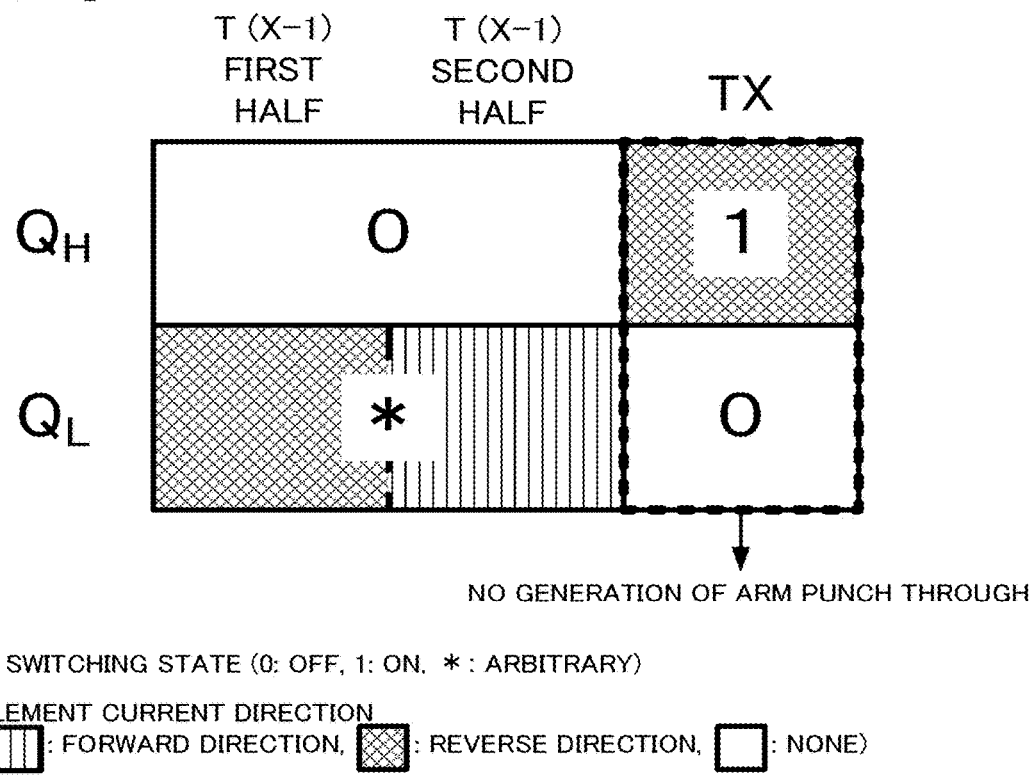

[FIG. 12]
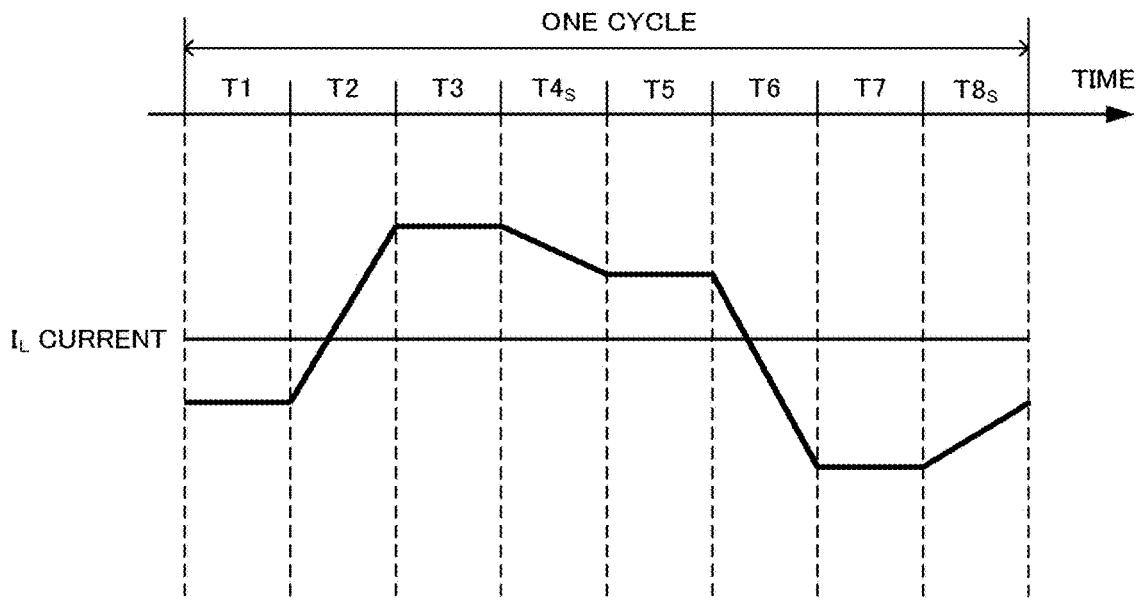
[FIG. 13]
|    | T1 | T2 | T3 | T4$_S$ | T5 | T6 | T7 | T8$_S$ |
|----|----|----|----|--------|----|----|----|--------|
| Q1 | 0  | 1  | 1  | 1      | 1  | 0  | 0  | 0      |
| Q2 | 1  | 0  | 0  | 0      | 0  | 1  | 1  | 1      |
| Q3 | 0  | 0  | 0  | 1      | 1  | 1  | 1  | 0      |
| Q4 | 1  | 1  | 1  | 0      | 0  | 0  | 0  | 1      |
| Q5 | 0  | 0  | 1  | 1      | 1  | 1  | 0  | 0      |
| Q6 | 1  | 1  | 0  | 0      | 0  | 0  | 1  | 1      |
| Q7 | 0  | 0  | 0  | 0      | 1  | 1  | 1  | 1      |
| Q8 | 1  | 1  | 1  | 1      | 0  | 0  | 0  | 0      |
SWITCHING STATE (0: OFF, 1: ON)
ELEMENT CURRENT DIRECTION
(▨ : FORWARD DIRECTION, ▧ : REVERSE DIRECTION)

[FIG. 14]
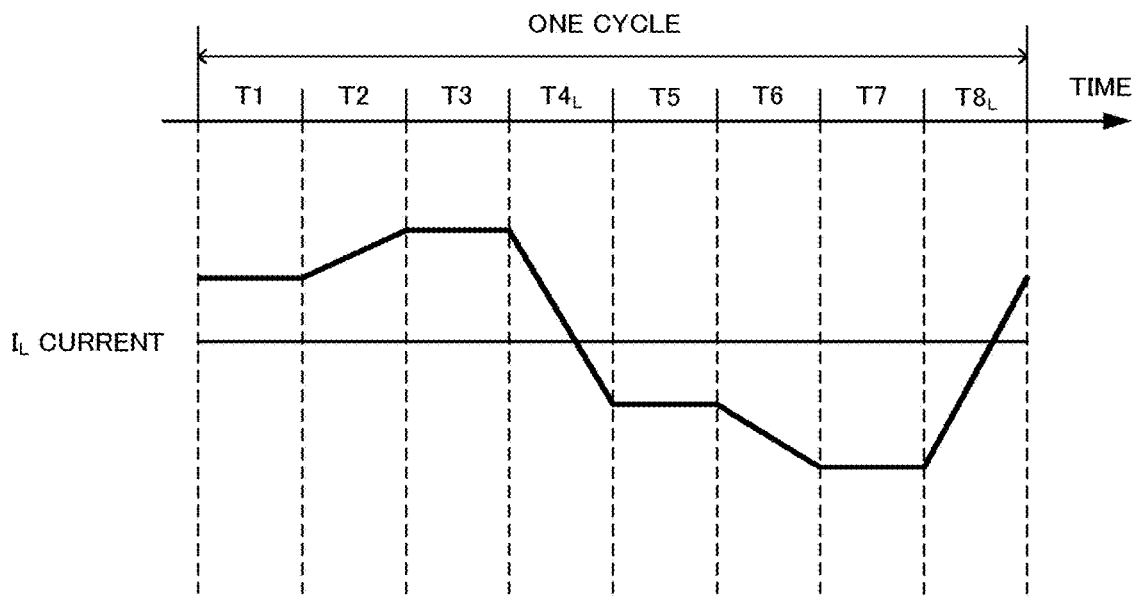
[FIG. 15]
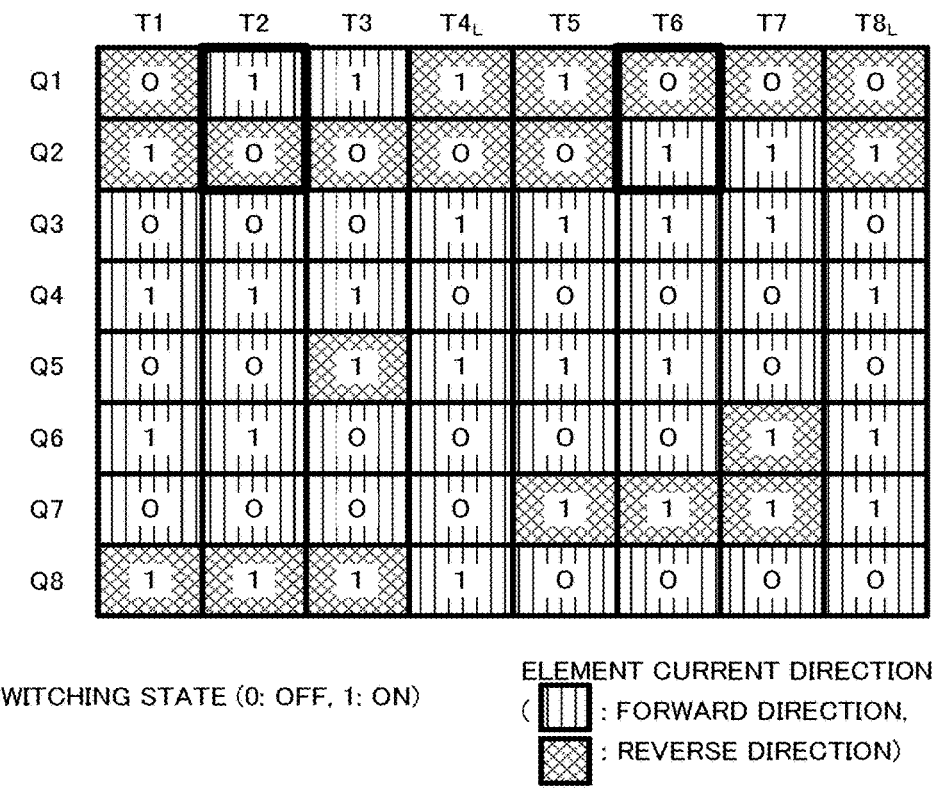

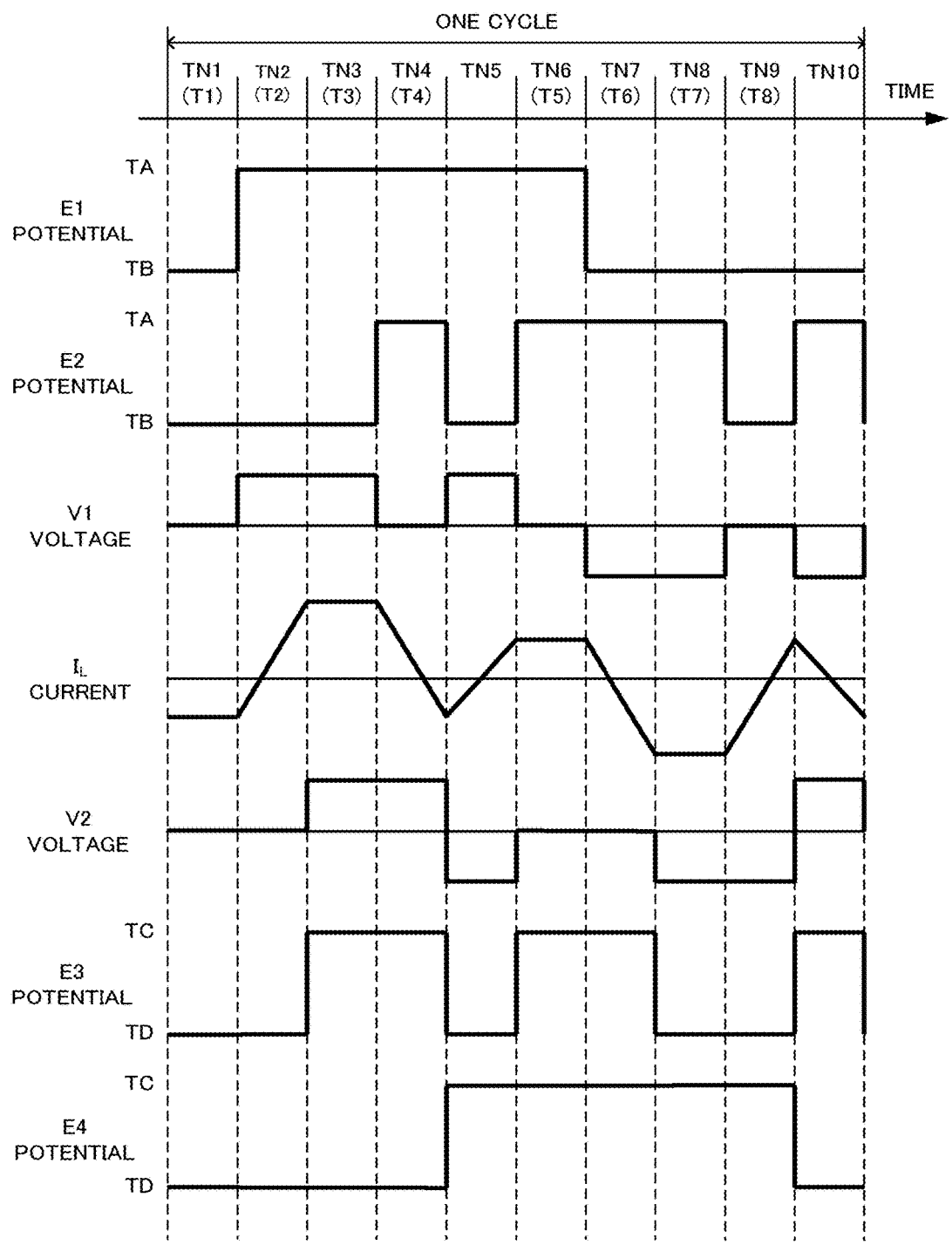

[FIG. 17]

OPERATION SWITCHING PATTERN OF EMBODIMENT

| | TN1 (T1) | TN2 (T2) | TN3 (T3) | TN4 (T4) | TN5 | TN6 (T5) | TN7 (T6) | TN8 (T7) | TN9 (T8) | TN10 |
|---|---|---|---|---|---|---|---|---|---|---|
| Q1 | 0 | 1 | 1 | 1 | 1 | 1 | 0 | 0 | 0 | 0 |
| Q2 | 1 | 0 | 0 | 0 | 0 | 0 | 1 | 1 | 1 | 1 |
| Q3 | 0 | 0 | 0 | 1 | 0 | 1 | 1 | 0 | 0 | 1 |
| Q4 | 1 | 1 | 1 | 0 | 1 | 0 | 0 | 1 | 1 | 0 |
| Q5 | 0 | 0 | 1 | 1 | 0 | 1 | 1 | 0 | 0 | 1 |
| Q6 | 1 | 1 | 0 | 0 | 1 | 0 | 0 | 1 | 1 | 0 |
| Q7 | 0 | 0 | 0 | 0 | 1 | 1 | 1 | 1 | 1 | 0 |
| Q8 | 1 | 1 | 1 | 1 | 0 | 0 | 0 | 0 | 0 | 1 |

SWITCHING STATE (0: OFF, 1: ON)

ELEMENT CURRENT DIRECTION
(☐: FORWARD DIRECTION, ▨: REVERSE DIRECTION)

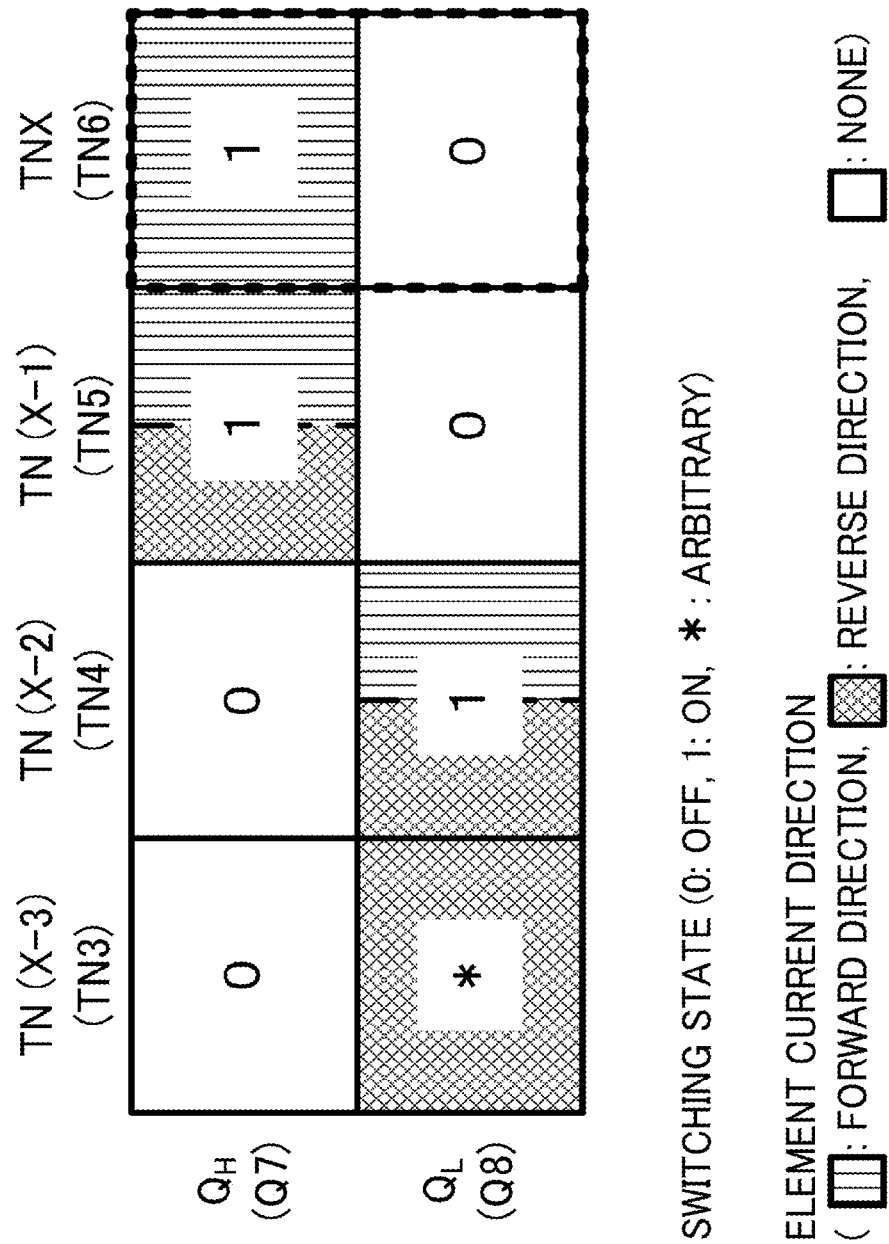
[FIG. 18]

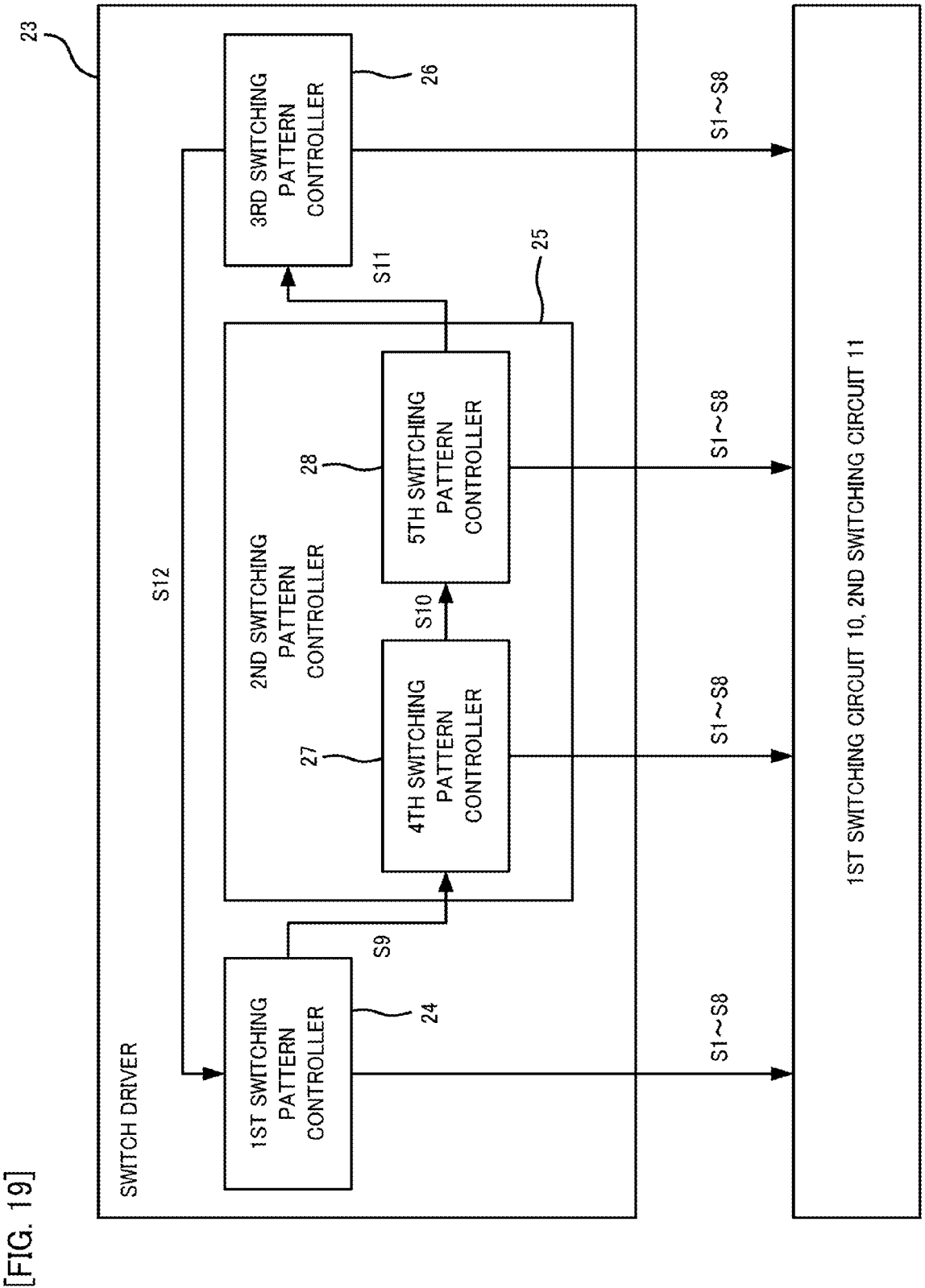
[FIG. 19]

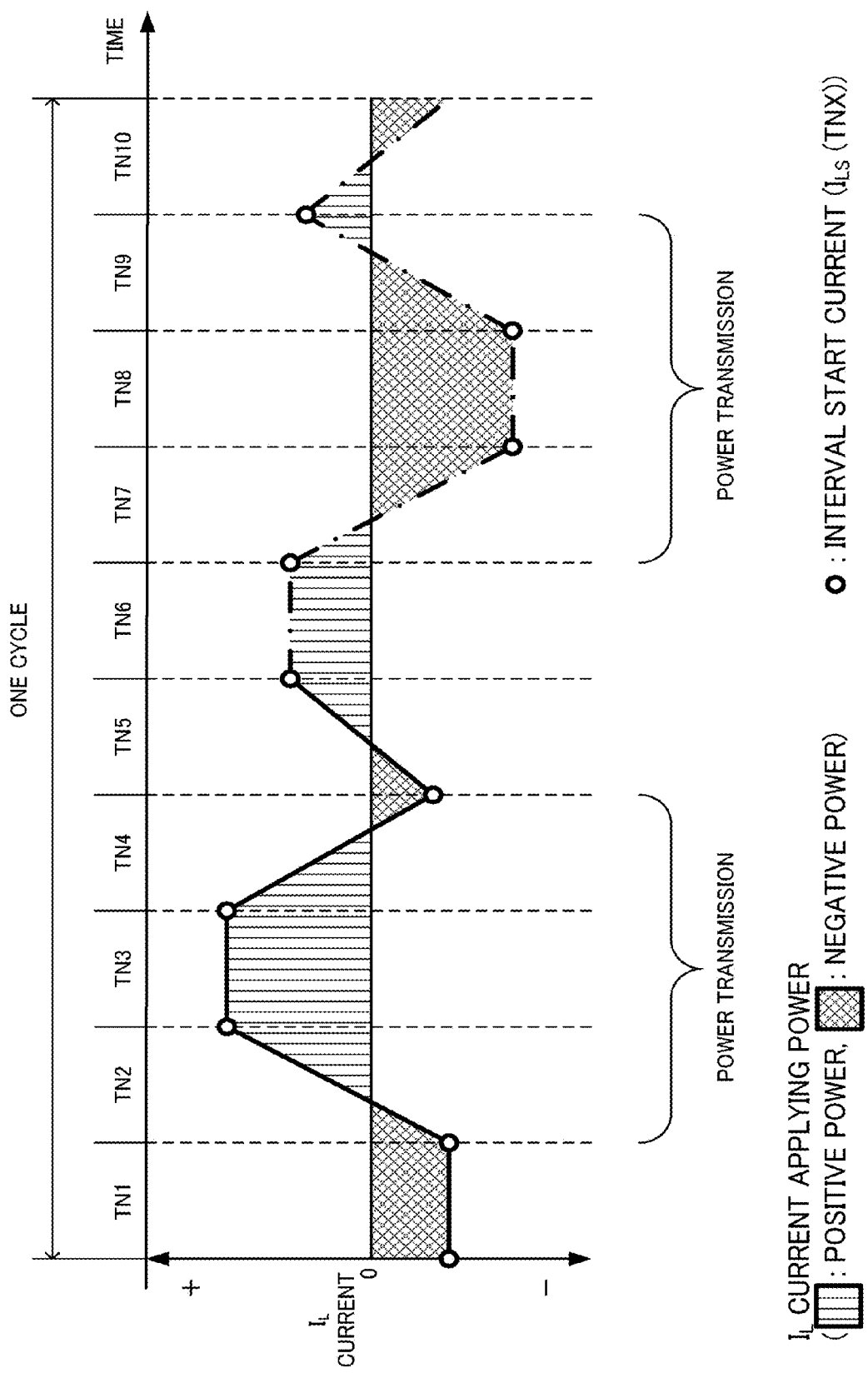

[FIG. 21]

| TNX | 1 | 2 | 3 | 4 | 5 | 6 | 7 | 8 | 9 | 10 |
|---|---|---|---|---|---|---|---|---|---|---|
| $I_{LS}$ (TNX) | − | − | + | + | − | + | + | − | − | + |

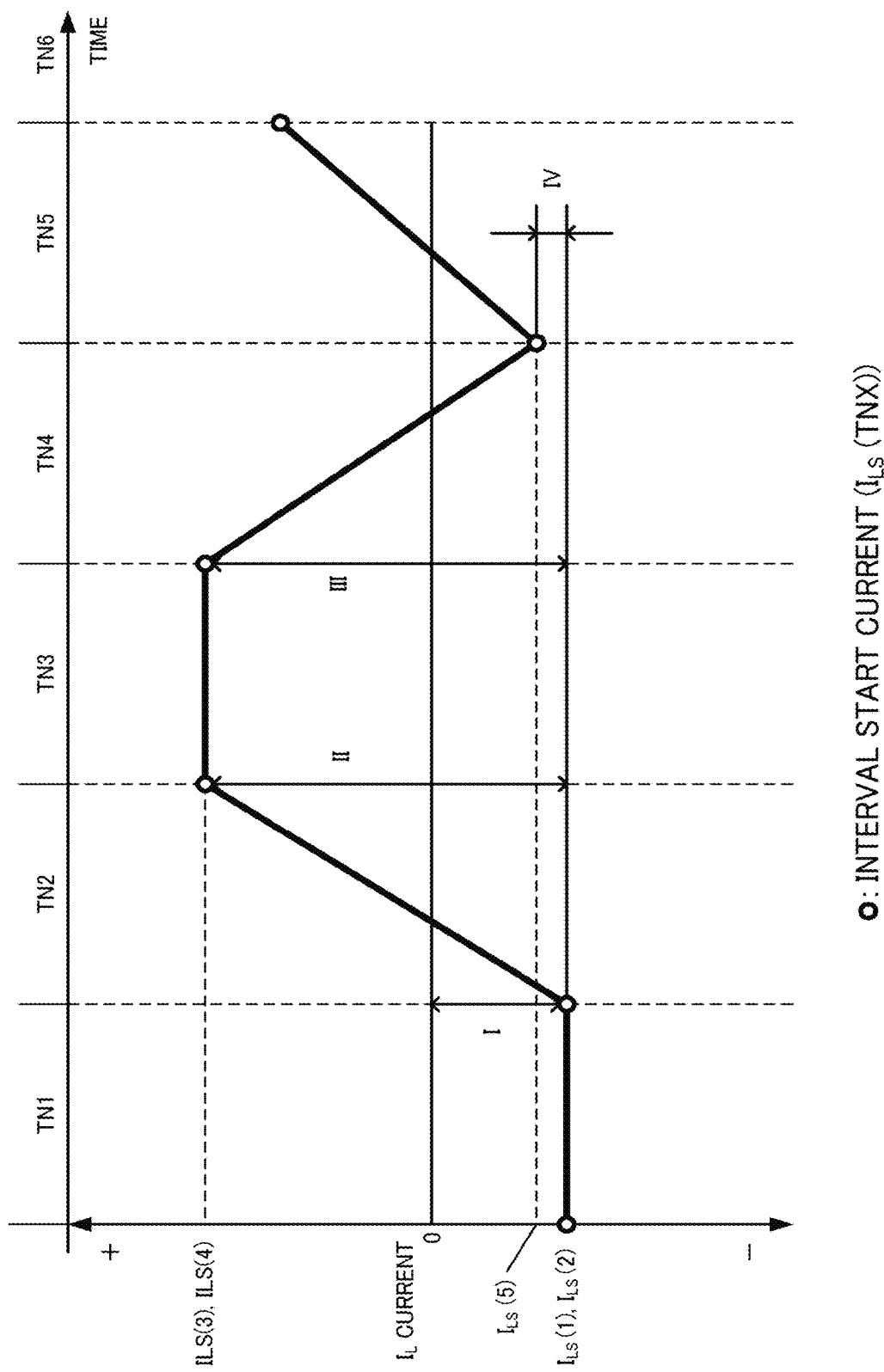
[FIG. 22]

[FIG. 23]
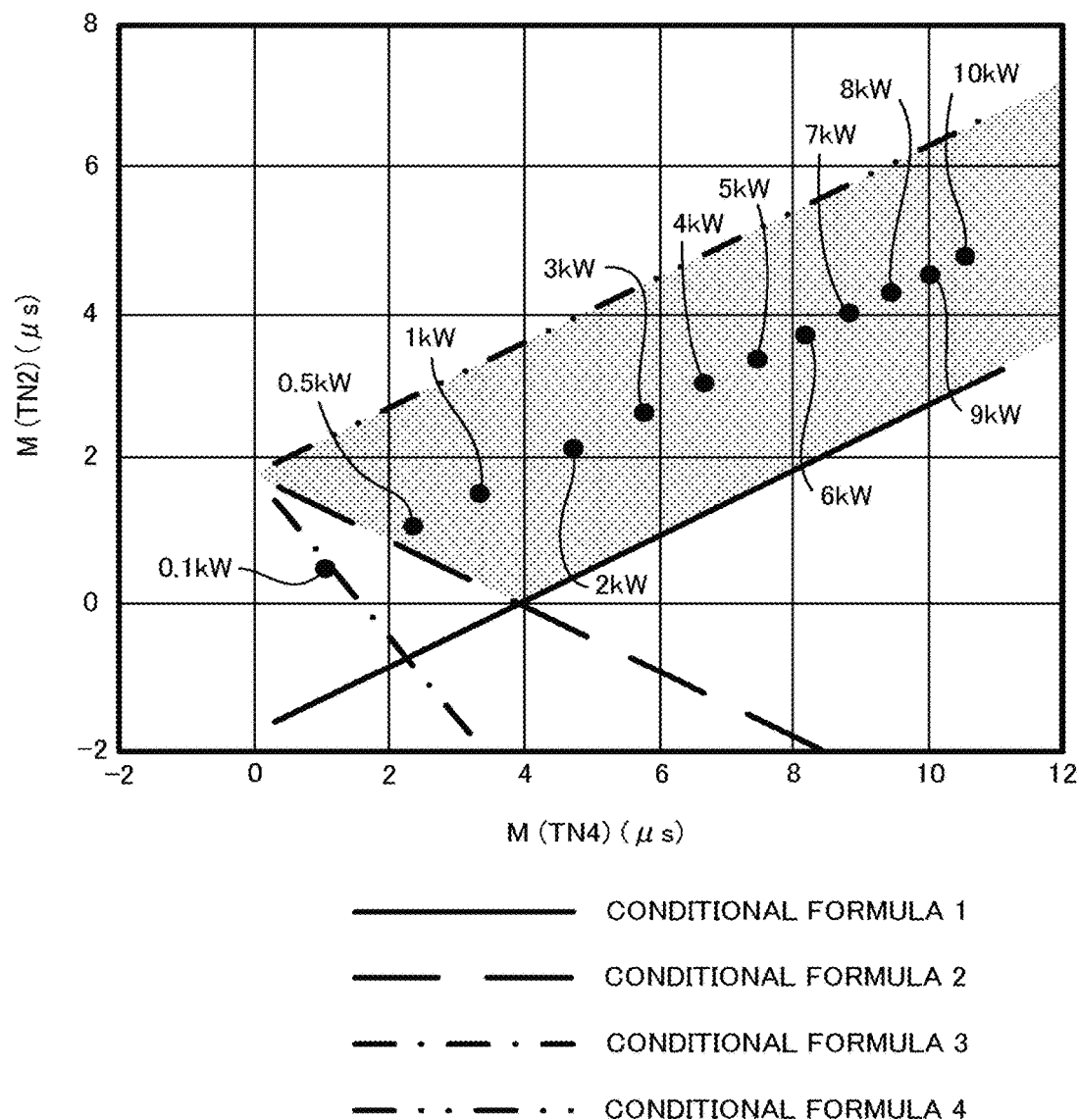

[FIG. 24]
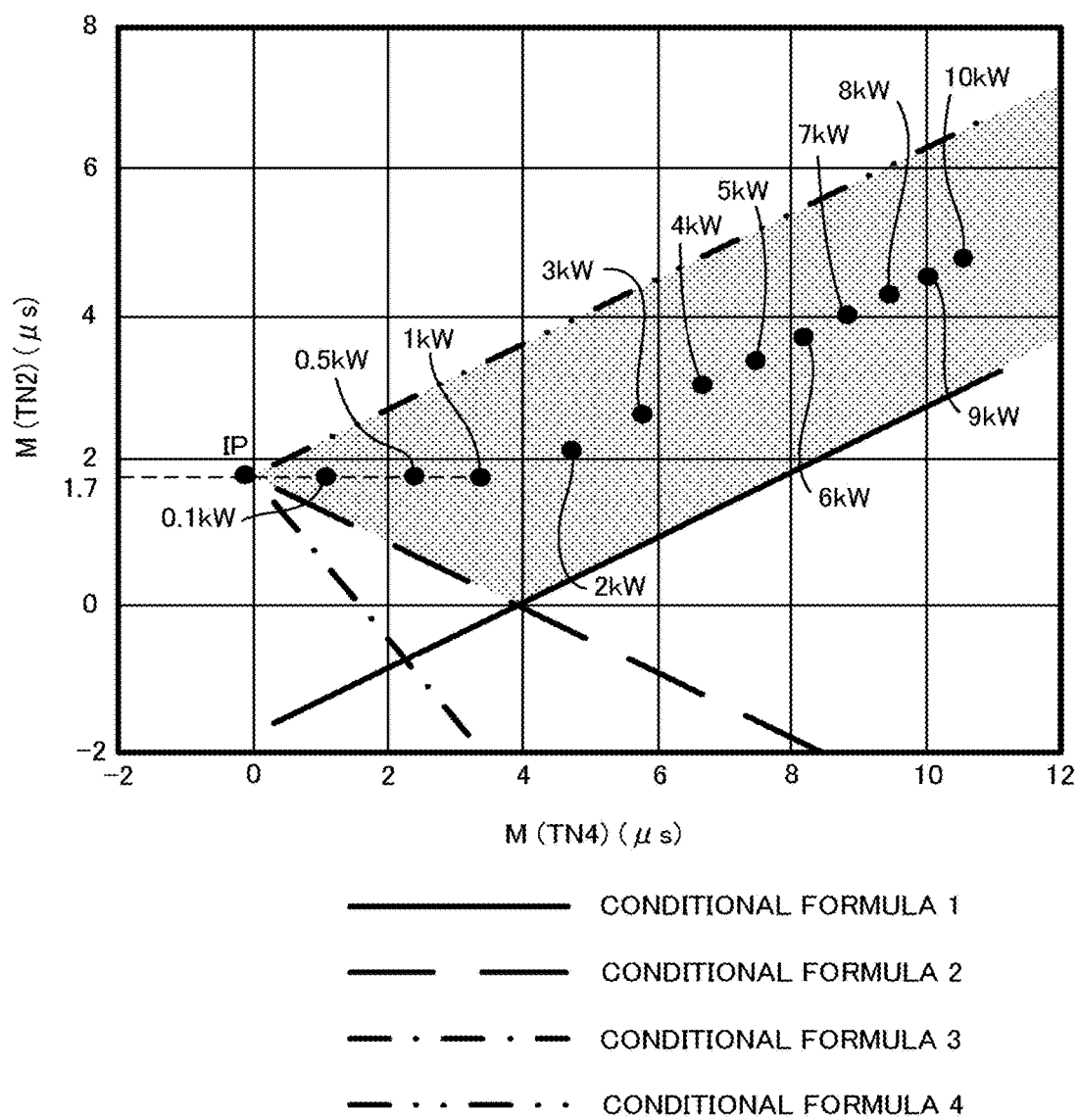

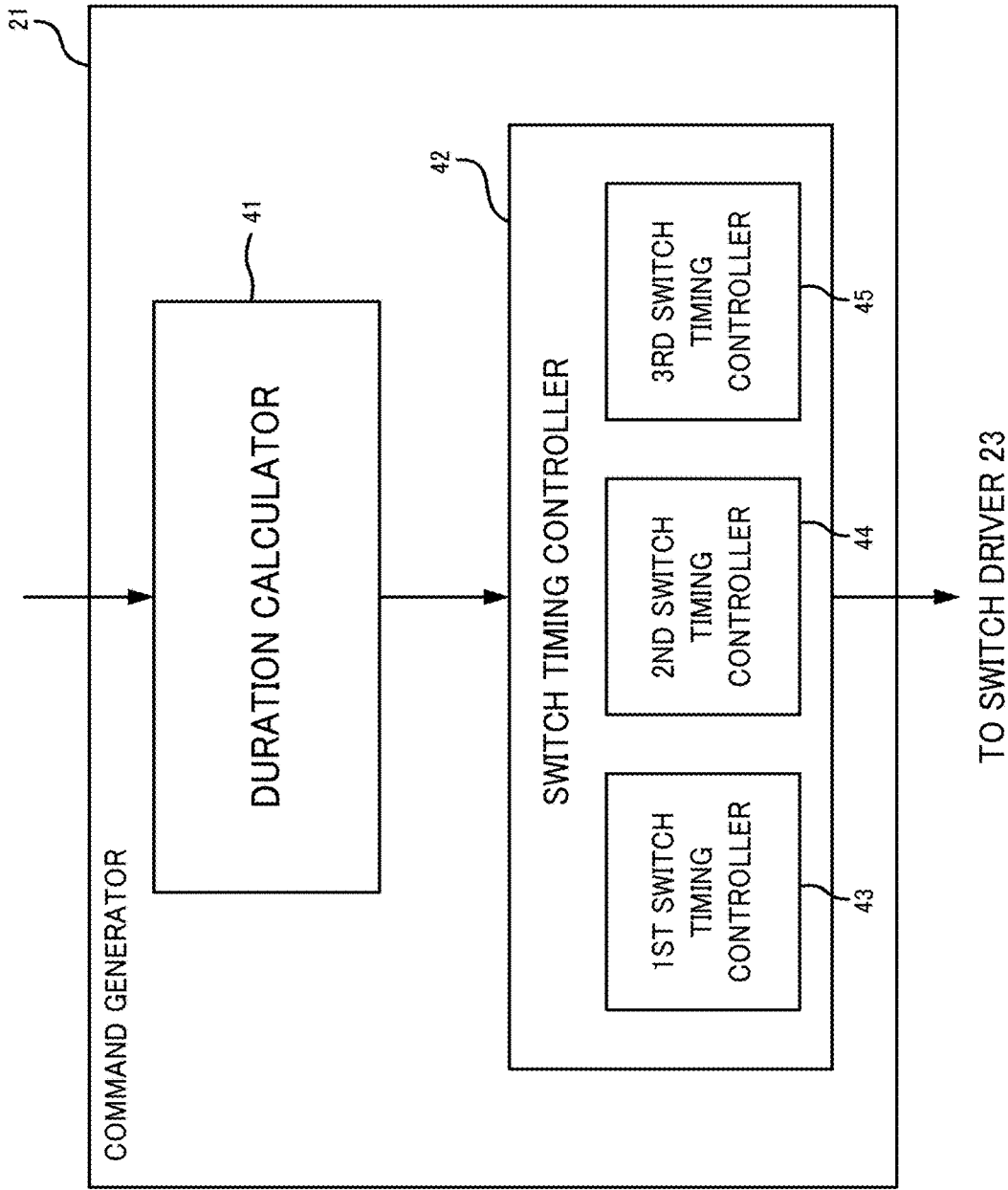
[FIG. 25]

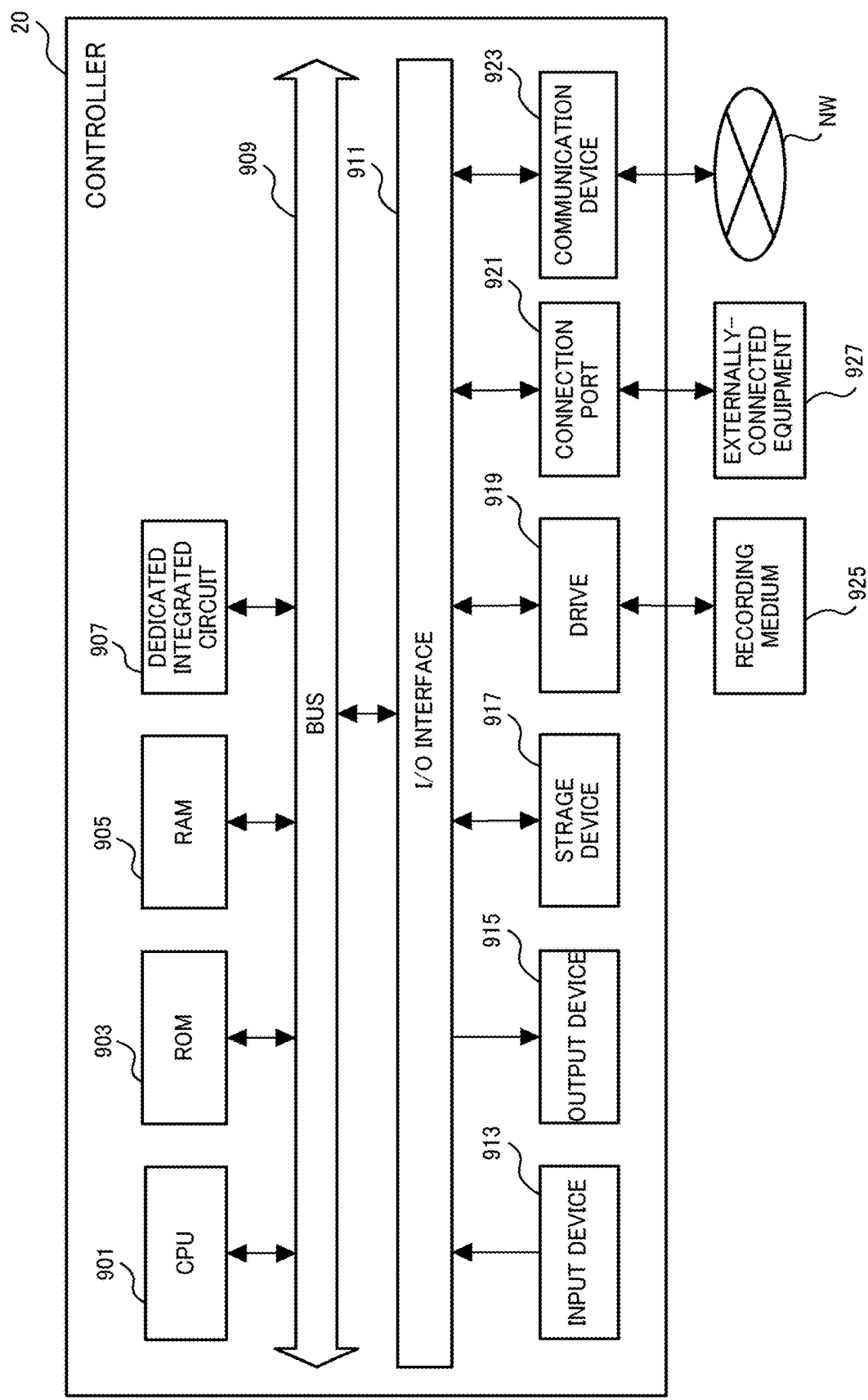
[FIG. 26]

POWER CONVERSION DEVICE AND POWER CONVERSION METHOD

CROSS-REFERENCE TO RELATED APPLICATION

The present application is based upon and claims the benefit of priority to Japanese Patent Application No. 2015-251063, filed Dec. 24, 2015 and No. 2016-195002, filed Sep. 30, 2016. The entire contents of this application are incorporated herein by reference.

BACKGROUND

Technical Field

The disclosed embodiment relates to a power conversion device and a power conversion method.

Description of Background Art

There is known a soft switching circuit using a MOSFET with a super-junction structure, in which a switching element includes an n-drift layer formed by sequentially laminating a thin p-layer and a thin n-layer in a soft switching circuit for a resonance operation with inductance by connecting a capacitor in parallel with the switching element.

SUMMARY

According to one aspect of the present disclosure, a power conversion device includes a switching circuit and a switch driver. The switching circuit includes a plurality of switching elements including a first switching element and a second switching element. The first switching element and the second switching element are electrically coupled in series. The switch driver is configured to control operations of the plurality of switching elements. The switch driver includes a first switching pattern controller, a second switching pattern controller, and a third switching pattern controller. The first switching pattern controller is configured to execute a first switching pattern which is set such that a current in a reverse direction flows through the first switching element and the second switching element is off. The second switching pattern controller is configured to execute a second switching pattern which is set such that a direction of the current flowing through the first switching element is switched to a forward direction from the reverse direction. The third switching pattern controller is configured to execute a third switching pattern which is set such that the first switching element is off and the second switching element is on.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 1 is a diagram showing an exemplary circuit configuration of a DC-DC converter related to an embodiment;

FIG. 2 is a diagram showing an exemplary operation time chart of a comparative example, performed by the DC-DC converter;

FIG. 3 is a diagram showing an exemplary switching pattern for realizing the operation of the comparative example in FIG. 2;

FIG. 4 is a diagram showing an exemplary configuration of a MOSFET with a super-junction structure as a single body;

FIG. 5 is a diagram showing an exemplary recovery property of a parasitic diode included in the MOSFET with the super-junction structure;

FIG. 6 is a diagram showing an exemplary arm punch through at an interval T1;

FIG. 7 is a diagram showing an exemplary arm punch through at an interval T5;

FIG. 8 is a diagram showing an exemplary generation condition pattern of the arm punch through at the interval T1;

FIG. 9 is a diagram showing an exemplary generation condition pattern of the arm punch through at the interval T5;

FIG. 10 is a diagram showing an exemplary zero-crossing operation performed at an interval T4 of the embodiment;

FIG. 11 is a diagram showing an exemplary switching pattern changed by the zero-crossing operation;

FIG. 12 is a diagram showing an exemplary changing waveform of $I_L$ current in the case of an unreached state to a zero-crossing point;

FIG. 13 is a diagram showing an exemplary switching pattern in the case of the unreached state to the zero-crossing point;

FIG. 14 is a diagram showing an exemplary changing waveform of the $I_L$ current in the case of a reached state to the zero-crossing point;

FIG. 15 is a diagram showing an exemplary switching pattern in the case of the reached state to the zero-crossing point;

FIG. 16 is a diagram showing an exemplary operation time chart of the embodiment;

FIG. 17 is a diagram showing an exemplary switching pattern for realizing the operation in FIG. 16;

FIG. 18 is a diagram showing an exemplary main part of a switching pattern that prevents the arm punch through of recovery current;

FIG. 19 is a diagram showing an exemplary functional configuration of a switch driver;

FIG. 20 is a diagram showing an exemplary basic temporal change waveform of the $I_L$ current in the case of applying the switching pattern;

FIG. 21 is a diagram showing an exemplary current direction condition of start current at each interval in the case of the waveform of the $I_L$ current in FIG. 20;

FIG. 22 is a diagram explaining an exemplary geometric analysis of the waveform of the $I_L$ current at intervals TN1-TN5;

FIG. 23 is a diagram showing an exemplary cycle lengths M(TN2) and M(TN4) in the case of operating a plurality of DC-DC converters with different output powers under a predetermined condition;

FIG. 24 is a diagram showing an exemplary method for including the cycle lengths M(TN2) and M(TN4) of each DC-DC converter within an area for simultaneously satisfying conditional formulae 1-4;

FIG. 25 is a diagram showing an exemplary functional configuration of a command generator; and FIG. 26 is a diagram showing an exemplary hardware configuration of a controller.

DETAILED DESCRIPTION OF THE EMBODIMENTS

Hereinbelow, a description will be given of an embodiment with reference to the drawings.

1: Schematic Configuration of DC-DC Converter

FIG. 1 is a diagram showing an exemplary circuit configuration of a DC-DC converter as an example of a power conversion device of the present embodiment. The DC-DC converter is, for example, an insulating-type DC-DC converter of a dual active bridge (DAB) system, and converts DC power with an indefinite voltage fed from an external power generating source (not shown) such as a solar cell, a DC generator, or a fuel cell into DC power with a predetermined voltage, and outputs the converted power.

In FIG. 1, a DC-DC converter 1 includes: a first switching circuit 10; a second switching circuit 11; a transformer 12; an inductance element 13; capacitors 14 and 15; current detectors 16 and 19; voltage detectors 17 and 18; and a controller 20.

The first switching circuit 10 (example of the switching circuit) is a bridge circuit having a plurality of switching elements Q1-Q4 full-bridge-connected. The first switching circuit 10 includes: a first arm formed by serially connecting the first upper arm switching element Q1 and the first lower arm switching element Q2; and a second arm formed by serially connecting the second upper arm switching element Q3 and the second lower arm switching element Q4. The first arm and the second arm are connected in parallel to an input side DC bus bar, the whole of which constitutes the first switching circuit 10.

Further, the second switching circuit 11 (example of the switching circuit) is a bridge circuit having a plurality of switching elements Q5-Q8 full-bridge-connected. The second switching circuit 11 includes: a third arm formed by serially connecting the third upper arm switching element Q5 and the third lower arm switching element Q6; and a fourth arm formed by serially connecting the fourth upper arm switching element Q7 and the fourth lower arm switching element Q8. The third arm and the fourth arm are connected in parallel to an output side DC bus bar, the whole of which constitutes the second switching circuit 11.

Here, each of the switching elements Q1-Q8 is a semiconductor switching element (refer to FIG. 4, which will be described later) formed by a metal-oxide-semiconductor field-effect transistor (MOSFET) with a super-junction structure. Hereinbelow, the MOSFET with the super-junction structure is properly abbreviated as SJMOSFET. Further, any one of the upper arm switching elements Q1, Q3, Q5, and Q7 and any one of the lower arm switching elements Q2, Q4, Q6, and Q8 corresponds to an example of the first switching element described in each claim, and the other corresponds to an example of the second switching element described in each claim.

The transformer 12 is connected between the first switching circuit 10 side and the second switching circuit 11 side. The primary side of the transformer 12 is connected to an intermediate point E1 between the first upper arm switching element Q1 and the first lower arm switching element Q2 and to an intermediate point E2 between the second upper arm switching element Q3 and the second lower arm switching element Q4. Further, the secondary side of the transformer 12 is connected to an intermediate point E3 between the third upper arm switching element Q5 and the third lower arm switching element Q6 and to an intermediate point E4 between the fourth upper arm switching element Q7 and the fourth lower arm switching element Q8. Note that, in the following, a winding ratio of a primary side winding to a secondary side winding of the transformer 12 is N (=n1/n2). The winding ratio N is variously set depending on usage applications of the DC-DC converter 1. However, in the present embodiment, N=1 is assumed. Further, the secondary side winding of the transformer 12 corresponds to an example of the winding described in each claim.

The inductance element 13 is specifically a coil (reactor), and is serially connected between an AC output side of the first switching circuit 10 and the primary side winding of the transformer 12. Here, in the example shown in FIG. 1, the inductance element 13 is serially connected between the intermediate point E1 and one terminal on the primary side of the transformer 12, and may be serially connected between the intermediate point E2 and the other terminal on the primary side of the transformer 12. Further, the inductance element 13 may be serially connected between any of the terminals on the secondary side of the transformer 12 and the intermediate point E3 or E4 corresponding to the terminal.

The capacitor 14 suppresses pulsation of an input side DC voltage on the input side DC bus bar, and is connected in parallel to the first switching circuit 10, to the input side DC bus bar. The capacitor 15 suppresses a pulse of an output side DC voltage of the output side DC bus bar, and is connected in parallel to the second switching circuit 11, to the output side DC bus bar.

An input side current detector 16 detects an instantaneous value of DC current flowing through the input side DC bus bar from an external power generating source (not shown). An output side current detector 19 detects an instantaneous value of DC current flowing through the output side DC bus bar. An input side voltage detector 17 detects an instantaneous value of an input side DC voltage VB applied to the input side DC bus bar. An output side voltage detector 18 detects an instantaneous value of an output side DC voltage VPN applied to the output side DC bus bar. Note that, depending on the usage application of the DC-DC converter 1, some of the detectors may be omitted.

The controller 20 includes a computer having a CPU, a RAM, a ROM, and the like, generates and outputs control signals S1-S8 for controlling the switching elements Q1-Q8 included in the first switching circuit 10 and the second switching circuit 11. The controller 20 has a command generator 21 and a switch driver 23. The command generator 21 generates a control command for making the DC-DC converter 1 perform desired power conversion based on DC current values detected by the input side current detector 16 and the output side current detector 19 respectively, DC voltage values detected by the input side voltage detector 17 and the output side voltage detector 18 respectively, and the winding ratio N of the transformer 12, and outputs the control command to the switch driver 23. The switch driver 23 generates corresponding control signals S1-S8 based on the control command input from the command generator 21, and outputs the control signals to the switching elements Q1-Q8 respectively. As a result, the switch driver 23 controls operations of the plurality of switching elements Q1-Q8 based on a first switching pattern, a second switching pattern, and a third switching pattern, which will be described later, for the plurality of first to fourth arms.

2: Basic Operation of DC-DC Converter

In the DC-DC converter 1 with the above configuration, DC power is fed to the input side DC bus bar via input side power feeding terminals TA and TB from an external power generating source (e.g., a solar cell, a DC generator, or a fuel cell). Further, switching of the switching elements Q1-Q4 in the first switching circuit 10 is properly controlled, thereby generating a primary side AC voltage V1 of a predetermined frequency between the two intermediate points E1 and E2.

On the other hand, switching of the switching elements Q5-Q8 in the second switching circuit 11 is properly controlled, thereby generating a secondary side AC voltage V2 of a predetermined frequency between the two intermediate points E3 and E4.

With a difference between the primary side AC voltage V1 and the secondary side AC voltage V2, the amount and direction of a current flowing through the inductance element 13 are changed, that is, a power converting direction between the primary side and the secondary side is changed. The controller 20 controls the switching of the switching elements Q1-Q8 in the first switching circuit 10 and the second switching circuit 11 so as to perform power conversion with desired power feeding direction and power feeding amount.

3: Comparative Example of Specific Operation of DC-DC Converter

As a comparative example, FIG. 2 is a diagram showing an example of a time chart showing an example of a specific operation for making the DC-DC converter 1 perform the basic operation. In FIG. 2, an operation is shown in one cycle (one carrier) of the AC voltage generated around the transformer 12 and one cycle is further divided into eight intervals T1-T8. As state elements indicating the operation, from the top, waveforms of the state change for each interval are shown for each of an E1 potential, an E2 potential, a V1 voltage, an $I_L$ current, a V2 voltage, an E3 potential, and an E4 potential. Here, in FIG. 2, VB=VPN is assumed.

The E1 potential shows the change in potential at the intermediate point E1 with cooperative switching of the first upper arm switching element Q1 and the first lower arm switching element Q2. As shown in FIG. 2, the E1 potential is a positive potential connected to a positive side wiring (terminal TA) of the input side DC bus bar at the internals T2-T5, and is a negative potential connected to a negative side wiring (terminal TB) of the input side DC bus bar at the intervals T1 and T6-T8.

The E2 potential shows the potential change at the intermediate point E2 with cooperative switching of the second upper arm switching element Q3 and the second lower arm switching element Q4. As shown in FIG. 2, the E2 potential is a positive potential connected to a positive side wiring of the input side DC bus bar at the internals T4-T7, and is a negative potential connected to a negative side wiring of the input side DC bus bar at the intervals T1-T3 and T8.

The V1 potential shows the change in the primary side AC voltage V1 applied between the intermediate points E1 and E2. As shown in FIG. 2, the V1 voltage is a positive voltage at the intervals T2 and T3 by the change in the E1 potential and the E2 potential, is a negative voltage at the intervals T6 and T7, and is further an AC voltage with a rectangular wave shape of zero voltage at the intervals T1, T4, T5, and T8.

The $I_L$ current shows the change in current $I_L$ flowing through the inductance element 13 (flowing direction is an arrow direction in FIG. 1, that is, a direction from the intermediate point E1 to the intermediate point E2 is assumed to be a positive direction). The $I_L$ current is determined by a difference between the V1 voltage and the V2 voltage and time (cycle length of interval). Specifically, in the case that the inductance of the inductance element 13 is L, the $I_L$ current flows with a relationship of $L \times dIL/dt = V1 - V2$. As a result, as shown in FIG. 2, the $I_L$ current flows through increase with time at the interval T2, at the interval T3, the $I_L$ current flows by an initial value determined depending on how much the current increased at the interval before the interval T3 and time change determined depending on a magnitude relationship between V1 and V2. The $I_L$ current flows through reduce with time at the interval T4. In addition, at the intervals T6-T8, the $I_L$ current flows with a waveform having a polarity reversed to that at the intervals T2-T4. Note that, in the present embodiment, an operation for converting the power between the primary side and the secondary side of the transformer 12 is described with examination focusing on the $I_L$ current. That is, a description will be given by assuming that the current on the primary side flows through the secondary side (or contrary to that) depending on the winding ratio N.

The V2 voltage shows the change in the secondary side AC voltage V2 applied between the intermediate points E3 and E4. The V2 voltage is an AC voltage with a rectangular wave shape determined depending on a switching pattern of the second switching circuit 11 and a current direction at that time.

The E3 potential shows the change in potential at the intermediate point E3 with cooperative switching of the third upper arm switching element Q5 and the third lower arm switching element Q6. As shown in FIG. 2, the E3 potential is a positive potential connected to a positive side wiring (terminal TC) of the output side DC bus bar at the intervals T3-T6, and is a negative potential connected to a negative side wiring (terminal TD) of the output side DC bus bar at the intervals T7-T8 and T1-T2.

The E4 potential shows the change in potential at the intermediate point E4 with cooperative switching of the fourth upper arm switching element Q7 and the fourth lower arm switching element Q8. As shown in FIG. 2, the E4 potential is a positive potential connected to a positive side wiring of the output side DC bus bar at the intervals T5-T8, and is a negative potential connected to a negative side wiring of the output side DC bus bar at the intervals T1-T4.

With the operation in the above comparative example, the DC-DC converter 1 generates the primary side AC voltage V1 and the secondary side AC voltage V2 by the switching of the first switching circuit 10 and the second switching circuit 11 synchronously in each interval, changes the amount and direction of a current flowing through the inductance element 13 with a difference between the generated voltages, and thus a power feeding amount and a power feeding direction change. There is an interval in which both the voltages V1 and V2 are positive, or an interval in which they are negative, and thereby the power converting efficiency can be improved. Further, the waveform shapes of the $I_L$ current and the V2 voltage (oscillation width and inclination of a straight line at each interval) are changed by the winding ratio N of the transformer 12 and the cycle length of the intervals T1-T8.

FIG. 3 shows an example of switching patterns of the arm switching elements Q1-Q8 for realizing the operations in the comparative example. In FIG. 3, "0" shows an OFF state and "1" shows an ON state (hereinbelow, similar in corresponding diagrams).

4: Problem in Comparative Example

However, in the case that the operation in the comparative example based on the switching patterns is applied to the DC-DC converter 1 of the present embodiment, there is a problem that the power converting efficiency deteriorates by so-called arm punch through of recovery current. In the present embodiment, "arm punch through" means that a through-current flows through at least one of the first arm, the second arm, the third arm, and the forth arm, each of the arms including the upper arm switching element and the lower arm switching element. Specifically, as described above, the SJMOSFET is used for the arm switching elements Q1-Q8 of the first switching circuit 10 and the second switching circuit 11, thereby causing loss in the case of applying the operation in the comparative example. Hereinbelow, a detailed description will be given of the point.

FIG. 4 is a diagram showing an example of configuration of an SJMOSFET 31 as a single body. In the SJMOSFET 31, a drain electrode D is connected to a wiring on the positive potential side, and a source electrode S is connected to a wiring on the negative potential side. By switching a gate-source voltage between a gate electrode G and the source electrode S, a conductive state (ON state) and a cutoff state (OFF state) are switched between the drain electrode D and the source electrode S. With the potential relationship, element current $I_Q$ flows in a direction from the drain electrode D to the source electrode S in the conductive state. Furthermore, in the case that the potential of the source electrode S is higher than that of the drain electrode D, the element current $I_Q$ can flow in a direction from the source electrode S to the drain electrode D via the parasitic diode 32, which will be described later, irrespective of the conduction state. Here, the direction of the element current $I_Q$ flowing from the drain electrode D to the source electrode S is referred to as a "forward direction" and the direction flowing from the source electrode S to the drain electrode D thereof is referred to as a "reverse" direction.

As shown in FIG. 1, with the general polarity, the drain electrodes D of the upper arm switching elements Q1, Q3, Q5, and Q7 are connected to the positive side wiring of the DC bus bar, and the source electrodes S of the lower arm switching elements Q2, Q4, Q6, and Q8 are connected to the negative side wiring of the DC bus bar. Further, the source electrodes S of the upper arm switching elements Q1, Q3, Q5, and Q7 are connected to the drain electrodes D of the corresponding lower arm switching elements Q2, Q4, Q6, and Q8 via the intermediate points E1-E4.

Moreover, in common to various MOSFET devices, a so-called parasitic diode 32 (referred to also as a body diode) is potentially incorporated therein because of the configuration. The parasitic diode 32 is connected in a direction from the source electrode S to the drain electrode D as the forward direction, that is, a current $I_{AK}$ flows in the reverse direction of the element current $I_Q$.

In the case of the SJMOSFET 31, there is a feature that recovery current of the built-in parasitic diode 32 is high. That is, as shown in FIG. 5, when the parasitic diode 32 is seen as a single body, just after the voltage $V_{AK}$ applied to the parasitic diode 32 is switched from a forward voltage to a reverse voltage, the reverse current temporarily highly flows as recovery current $I_R$. This is because the reverse current temporarily flows by movement of electrons in a process for forming a depletion layer when switching from the forward voltage to the reverse voltage at a PN junction part in the parasitic diode 32.

As described above, in the DC-DC converter 1 using the SJMOSFET 31 having high recovery current of the parasitic diode 32 as each of the arm switching elements Q1-Q8, in the case of applying the switching patterns in FIG. 3, as shown in FIG. 3, the arm punch through occurs at the intervals T1 and T5 in the fourth arm having the switching elements Q7 and Q8 (refer to a thick line frame in FIG. 3). Note that a shaded portion of a background in FIG. 3 basically shows a direction of the element current $I_Q$ that continues to the switching at the next interval as the switching result at the interval or a direction of the element current $I_Q$ flowing just near the interval in the OFF state. A background with vertical lines shows a forward direction (i.e., from D to S direction) of the element current $I_Q$, and a background with a shaded portion shows a reverse direction (i.e., from S to D direction) of the element current $I_Q$. Furthermore, in the switching pattern shown in FIG. 3, in viewpoint of preventing vertical short-circuit between the DC bus bars, there is not combination in which the upper arm switching element and the lower arm switching element in the same arm are simultaneously in the ON-state. Here, in the direction of the element current $I_Q$ expressed with the shaded portion of the background, the first-half direction can be changed from the second-half direction even in the same interval. In the case that the element current $I_Q$ does not flow such as in the OFF state, the direction is assumed to be a just-near direction following the relevant interval.

In the case of the fourth arm at the interval T1, for example, the arm punch through of the recovery current $I_R$ is generated as shown in FIG. 6. That is, as shown in FIG. 3, at the interval T8 just before T1, the direction of the element current $I_Q$ is the reverse one in the whole fourth arm (the element current $I_Q$ actually flows through only the fourth upper arm switching element Q7), and the fourth upper arm switching element Q7 is in the ON state and the fourth lower arm switching element Q8 is in the OFF state. At the next interval T1, the ON/OFF states of the arm switching elements Q7 and Q8 are reversed. In this case, at the interval T1, while the fourth lower arm switching element Q8 is in the ON state and the other fourth upper arm switching element Q7 is in the OFF state, the recovery current $I_R$ flows through the parasitic diode 32. Thereby, as shown in FIG. 6, the DC bus bars are vertically short-circuited so as to punch through the whole fourth arm. As a result, charges of the capacitor 15 are temporarily discharged to cause loss, which may cause damage to the arm switching elements Q7 and Q8 depending on cases.

Similarly, in the case of the fourth arm at the interval T5, as shown in FIG. 3, the direction of the element current $I_Q$ is reverse in the whole fourth arm at the interval T4 just before T5, the fourth upper arm switching element Q7 is in the OFF state, and the fourth lower arm switching element Q8 is in the ON state. At the next interval T5, the ON/OFF states of the arm switching elements Q7 and Q8 are reversed. In this case, while the fourth upper arm switching element Q7 is in the ON state and the other fourth lower arm switching element Q8 is in the OFF state at the interval T5, the recovery current $I_R$ flows through the parasitic diode 32. Thereby, as shown in FIG. 7, the DC bus bars are vertically short-circuited so as to punch through the whole fourth arm.

In general, the SJMOSFET 31 is advantageous in viewpoint of manufacturing costs because the switching speed is high, ON-resistance is low, and the price is lower than that of a wide band gap semiconductor such as GaN or SiC. Because of the magnitude of the recovery current, the SJMOSFET 31 is not suitable for usage to specific circuit configuration or operation method. Further, it is possible to consider a configuration in which by addition of a passive element, the switching elements Q1-Q8 are reversely recovered in advance before the switching. However, in this case, there is a problem of increase in manufacturing costs.

5: Operation of the Present Embodiment

In the present embodiment, the power converting efficiency is improved with a software-like method for controlling the driving of the switching elements Q1-Q8 with a switching pattern for preventing a generation condition of the arm punch through shown in FIGS. 6 and 7.

Firstly, in the case of the arm punch through at the interval T1 shown in FIG. 6, a switching pattern shown in FIG. 8 is a generation condition. That is, in an upper arm switching element $Q_H$ and a lower arm switching element $Q_L$ of the same arm, it is assumed that the element current $I_Q$ of the upper arm switching element $Q_H$ is in the reverse direction at an interval T(X−1), and the lower arm switching element $Q_L$ is in the OFF state. When the upper arm switching element $Q_H$ is in the OFF state and the lower arm switching element $Q_L$ is switched to the ON state at the next interval TX, a high voltage is applied to the upper arm switching element $Q_H$ through which the element current $I_Q$ previously flows in the reverse direction, and the arm punch through shown in FIG. 6 is generated at the interval TX.

Note that the upper arm switching element $Q_H$ may be in the ON state or OFF state at the interval T(X−1). This is because, in the case that the element current $I_Q$ of the upper arm switching element $Q_H$ is in the reverse direction, current flows through the parasitic diode 32 in the forward direction even when the switching element is in the ON state or OFF state. Therefore, in the present embodiment, the case that "the current in the reverse direction flows through the switching element" includes a case that the switching element is in the ON state or OFF state. Here, the direction of the element current $I_Q$ of the lower arm switching element $Q_L$ at the interval TX is actually determined in a certain direction (forward direction in the example shown in FIG. 8). Moreover, the current of the lower arm switching element $Q_L$ at the interval TX is zero in the case that the current of the upper arm switching element $Q_H$ at the interval T(X−1) is zero.

Furthermore, in the case of the arm punch through at the interval T5 shown in FIG. 7, a switching pattern shown in FIG. 9 is a generation condition. That is, it is assumed that at the interval T(X−1), the upper arm switching element $Q_H$ is in the OFF state and the element current $I_Q$ of the lower arm switching element $Q_L$ is in the reverse direction. When the upper arm switching element $Q_H$ is switched to the ON state and the lower arm switching element $Q_L$ is switched to the OFF state at the next interval TX, a high voltage is applied to the lower arm switching element $Q_L$ through which the element current $I_Q$ in the reverse direction previously flows, and the arm punch through shown in FIG. 7 is generated at the interval TX.

Note that the lower arm switching element $Q_L$ at the interval T(X−1) may be in the ON state or OFF state. Here, the direction of the element current $I_Q$ of the upper arm switching element $Q_H$ at the interval TX is actually determined in a certain direction (forward direction in the example in FIG. 9). Further, the current of the upper arm switching element $Q_H$ at the interval TX is zero in the case that the current of the lower arm switching element $Q_L$ is zero at the interval T(X−1).

To the two generation condition patterns, it is common that the direction of the element current $I_Q$ is reverse at the previous interval in one switching element different from the other switching element that is switched from the OFF state to the ON state in each arm. That is, the generation condition is a pattern with a shaded background obliquely before "1" switched from "0" in the expression of the switching pattern in each arm. Note that there is a dead time for a short period between the respective states, that is, the simultaneous OFF-state of the upper arm switching element $Q_H$ and the lower arm switching element $Q_L$ in the actual switching operation. Even if the dead time is interpreted as one state, the generation condition can be similarly considered.

In the present embodiment, in order to prevent the two generation condition patterns, a zero-crossing operation of the $I_L$ current is performed. For example, as shown in FIG. 10, by a switching operation to expand a cycle length of the interval T4 by Δt, an operation for reversing the direction of the element current $I_Q$ of the switching elements Q1-Q8 is performed (this operation means an operation for crossing to a zero-value, and is referred to as a zero-crossing operation in the present embodiment). Note that, in the operation of the comparative example shown in FIG. 2, the cycle length of the interval T4 is set not to perform the zero-crossing by intentionally setting an input voltage of $I_L$ to exactly zero.

In the present embodiment, the zero-crossing operation is performed as described above, thereby reversing the direction of the element current $I_Q$ at the previous interval in one switching element different from the other switching element that is switched from the OFF state to the ON state. This operation results in setting a switching pattern as shown in FIG. 11. That is, although the direction of the element current $I_Q$ is reverse in the first-half of the previous interval T(X−1) with respect to the interval TX (corresponding to the interval T5 of the operation in the comparative example) at which the arm punch through is generated in the operation of the comparative example, the direction of the element current $I_Q$ is reverse in the second-half of the same interval T(X−1) to be the forward direction while keeping the switching state of the whole arm. That is, an oblique previous part of "1" in the switching pattern is a background with vertical lines. Therefore, the arm punch through at the interval TX (interval T5) can be prevented.

Moreover, although not shown in the diagram, by performing the zero-crossing operation for increasing the input voltage of $I_L$ from a negative value to a positive value while similarly extending a cycle length of the interval T8 by Δt (by using the switching pattern that is reversed vertically from that in FIG. 11), it is possible to prevent the arm punch through at the interval T1.

However, in order to completely prevent the arm punch through in the whole DC-DC converter 1, it is necessary to set a cycle length of the interval T4 within a limited range, and adjustment thereof is difficult. In the case that the cycle length of the interval T4 is too short, for example, the $I_L$ current does not reach the zero-crossing point at short intervals $T4_S$ and $T8_S$ as shown in FIG. 12, and the direction of the element current $I_Q$ is consequently changed as a pattern shown in FIG. 13. However, the arm punch through of the fourth arm at the intervals T1 and T5 are not prevented (the element current $I_Q$ is still in the reverse direction in Q8 of $T4_S$ and in Q7 of $T8_S$).

On the other hand, in the case that the cycle length of the interval T4 is set to a proper length, the $I_L$ current becomes zero-crossing at long intervals $T4_L$ and $T8_L$ as shown in FIG. 14, and the direction of the element current $I_Q$ is consequently changed as in a pattern shown in FIG. 15. However, with the pattern, although the arm punch through is prevented in the fourth arm, in turn the arm punch through will be generated at each of the intervals T2 and T6 in the arm different from the fourth arm i.e. the first arm in the example, (the element current $I_Q$ is in the reverse direction in Q2 of T1 and in Q1 of T5).

As described above, in the present embodiment, an operation is performed with a time chart shown in FIG. 16 corresponding to FIG. 2. In the time chart, one cycle is divided into ten intervals TN1-TN10, and the intervals TN1-TN4 respectively correspond to the intervals T1-T4 in the operation of the comparative example shown in FIG. 2, and the intervals TN6-TN9 respectively correspond to the intervals T5-T8 in the operation of the comparative example shown in FIG. 2. That is, in the operation time chart in the present embodiment, the zero-crossing operation is performed at the intervals TN4 and TN9 obtained by respectively extending the intervals T4 and T8 in the operation of the comparative example. Further, the operation time chart is equal to a time chart obtained by additionally inserting the interval TN5 between the intervals T4 and T5 and further additionally inserting the interval TN10 between the intervals T8 and T1. Note that, for the sake of convenience of illustration, the intervals TN1-TN10 are shown at an equal interval.

At the new interval TN5, the E1 potential is a positive potential and the E2 potential is a negative potential, and the V1 voltage is consequently a positive voltage. For this reason, while the $I_L$ current is a negative value at the interval TN4, the $I_L$ current is zero-crossed in the reverse direction to return to a positive value at the interval TN5. Further, at a new interval TN10, the E1 potential is a negative potential, the E2 potential is a positive potential, and the V1 voltage is consequently a negative potential. For this reason, while the $I_L$ current is a positive value at the interval TN9, the $I_L$ current is zero-crossed in the reverse direction to return to a negative value at the interval TN10.

FIG. 17 shows a switching pattern that realizes an operation time chart in the present embodiment described above. A switching state of each of the switching elements shown by the switching pattern in FIG. 17 and a pattern in an element current direction do not include generation condition patterns (patterns in FIGS. 8 and 9) of the arm punch through at any intervals. That is, with the switching pattern in the present embodiment, it is possible to prevent the generation of the arm punch through of recovery current in any of the first to fourth arms and at any of the intervals in the DC-DC converter 1.

FIG. 18 shows features of the switching pattern at a part that prevents, particularly, the arm punch through of the recovery current, in the switching patterns shown in FIG. 17 of the present embodiment. In the operation of the comparative example, the element current $I_Q$ in the reverse direction flows through the lower arm switching element $Q_L$ at an interval TN(X-3) before three intervals of an interval TNX (corresponding to the interval T5 of the operation in the comparative example or the interval T6 in the present embodiment, respectively) at which the arm punch through is generated, and the upper arm switching element $Q_H$ is in the OFF state. Further, the direction of the element current $I_Q$ flowing through the lower arm switching element $Q_L$ is switched from the reverse direction to the forward direction at intervals TN(X-2) to TN(X-1). Furthermore, at the interval TNX, the lower arm switching element $Q_L$ is in the OFF state and the upper arm switching element $Q_H$ is in the ON state.

Combination of the ON/OFF states of the whole arm switching elements Q1-Q8 at the interval TN(X-2) is in a predetermined state different from a state at the interval TN(X-3). The predetermined state is kept until the direction of the element current $I_Q$ of the lower arm switching element $Q_L$ is switched from the reverse direction to the forward direction at the interval TN(X-2). Further, at the interval TN(X-1), the current direction flowing through the transformer 12 is reversed from the last state at the interval TN(X-2). That is, the intervals TN(X-2) and TN(X-1) can also be intervals for controlling the current direction.

By switching with the switching pattern having the features as described above, it is possible to prevent the arm punch through of the recovery current at the interval TNX (interval TN6). Moreover, although not shown, it is possible to prevent the arm punch through of the recovery current at the interval TN1 by applying a pattern part that is reversed vertically in FIG. 18 even at the interval TN1 of the present embodiment.

Note that the switching pattern at the interval TN(X-3) corresponds to an example of a first switching pattern described in each claim, the switching patterns at the intervals TN(X-2) and TN(X-1) correspond to an example of a second switching pattern described in each claim, and the switching pattern at the interval TNX corresponds to an example of a third switching pattern described in each claim. Further, the switching pattern at the interval TN(X-2) corresponds to an example of a fourth switching pattern described in each claim, and the switching pattern at the interval TN(X-1) corresponds to an example of a fifth switching pattern described in each claim. Furthermore, any one of the upper arm switching element $Q_H$ and the lower arm switching element $Q_L$ corresponds to an example of the first switching element described in each claim, and the other corresponds to an example of the second switching element described in each claim.

6: Functional Configuration of Switch Driver

Next, a description is given of an exemplary functional configuration of a switch driver 23 with reference to FIG. 19. Herein, a description is given by assuming that the switching pattern at the interval TN(X-3) shown in FIG. 18 is a first switching pattern, the switching patterns at the intervals TN(X-2) and TN(X-1) are second switching patterns, the switching pattern at the interval TNX is a third switching pattern, the switching pattern at the interval TN(X-2) is a fourth switching pattern, and the switching pattern at the interval TN(X-1) is a fifth switching pattern.

As shown in FIG. 19, the switch driver 23 includes: a first switching pattern controller 24; a second switching pattern controller 25; and a third switching pattern controller 26. The second switching pattern controller 25 includes: a fourth switching pattern controller 27; and a fifth switching pattern controller 28.

The first switching pattern controller 24 outputs control signals S1-S8 corresponding to the first switching pattern to the switching elements Q1-Q8 of the first switching circuit 10 and the second switching circuit 11, respectively, and controls operations of the switching elements Q1-Q8 based on the control command of the aforementioned command generator 21. Further, the first switching pattern controller 24 outputs a control signal S9 when completing a switching operation based on the first switching pattern (at time of passage of a cycle length of the interval TN(X-3) after outputting the control signals S1-S8).

The second switching pattern controller 25 outputs control signals S1-S8 corresponding to the second switching pattern to the switching elements Q1-Q8, respectively, based on the control command of the aforementioned command generator 21, and controls operations of the switching elements Q1-Q8.

That is, in the case that the fourth switching pattern controller 27 included in the second switching pattern controller 25 inputs the control signal S9 output from the first switching pattern controller 24, the fourth switching pattern controller 27 outputs the control signals S1-S8 corresponding to the fourth switching pattern to the switching elements Q1-Q8, respectively, to control the operations of the switching elements Q1-Q8. Further, in the case of completing the switching operation based on the fourth switching pattern (at time of passage of a cycle length of the interval TN(X−2) after outputting the control signals S1-S8), the fourth switching pattern controller 27 outputs a control signal S10.

In addition, in the case that the fifth switching pattern controller 28 included in the second switching pattern controller 25 inputs the control signal S10 output from the fourth switching pattern controller 27, the fifth switching pattern controller 28 outputs the control signals S1-S8 corresponding to the fifth switching pattern to the switching elements Q1-Q8, respectively, to control the operations of the switching elements Q1-Q8. Further, in the case of completing the switching operation based on the fifth switching pattern (at time of passage of a cycle length of the interval TN(X−1) after outputting the control signals S1-S8), the fifth switching pattern controller 28 outputs a control signal S11.

In the case that the third switching pattern controller 26 inputs the control signal S11 output from the fifth switching pattern controller 28, the third switching pattern controller 26 outputs the control signals S1-S8 corresponding to the third switching pattern to the switching elements Q1-Q8, respectively, and controls the operations of the switching elements Q1-Q8. Further, in the case of completing the switching operation based on the third switching pattern (at time of passage of a cycle length of the interval TNX after outputting the control signals S1-S8), the third switching pattern controller 26 outputs a control signal S12.

When the first switching pattern controller 24 inputs the control signal S12 output from the third switching pattern controller 26, the first switching pattern controller 24 executes the aforementioned switching control based on the first switching pattern. Subsequently, the switching control is repeated. Here, another switching pattern may be executed between the repeated switching patterns.

The second switching pattern controller 25, the fourth switching pattern controller 27, and the fifth switching pattern controller 28 corresponds to an embodiment of means for preventing a recovery current of at least one of the first switching element and the second switching element from flowing through a whole arm including the first switching element and the second switching element described in claims.

Note that processing of the aforementioned switching pattern controllers 24-28 or the like is not limited to the dividing example of the processing, and may be performed by a smaller number of processing units (e.g., one processing unit), and may be performed by a further-divided processing unit. Furthermore, the controller 20 including the switch driver 23 may be loaded by a program executed by a CPU 901 (refer to FIG. 26), which will be described later, or a part or all may be loaded by an actual device such as ASIC, FPGA, or another electrical circuit.

7. Setting Method of Cycle Length at Each Interval

Next, a description is given of a setting method of a cycle length at an interval with the switching pattern of the present embodiment. Herein, a description is given by assuming that switching patterns at the intervals TN3 and TN8 shown in FIG. 17 are first switching patterns, switching patterns at intervals TN4 and TN9 and intervals TN5 and TN10 are second switching patterns, switching patterns at intervals TN6 and TN1 are third switching patterns, switching patterns at intervals TN4 and TN9 are fourth switching patterns, and switching patterns at intervals TN5 and TN10 are fifth switching patterns.

As described above, it is not possible to prevent the arm punch through in the whole DC-DC converter 1 even in the case that a cycle length at each interval with the switching patter, in particular, cycle lengths at the respective intervals TN2, TN4, and TN5 (intervals TN7, TN9, and TN10) for controlling the $I_L$ current direction (positive value or negative value) are too short or long. Moreover, depending on the combination of the intervals, the cycle length can influence on the control in the $I_L$ current direction. Therefore, it is important to properly set the cycle length at each interval.

For example, FIG. 20 shows an example of a basic temporal change waveform of the $I_L$ current when applying the switching pattern of the present embodiment. The amplitude and cycle length at each interval of the $I_L$ current waveform are changed by setting an operation parameter of the DC-DC converter 1. As the operation parameter of the DC-DC converter 1, there are three elements of an input voltage (VB in the example), an output voltage (VPN in the example), and output power.

Even when the operation parameter of the DC-DC converter 1 is changed, the whole $I_L$ current waveform shown in the diagram is similarly changed, thereby preventing the arm punch through in the whole DC-DC converter 1 throughout the entire one cycle of the switching control. Here, in the case that an instantaneous value of the $I_L$ current at start time of an interval TNX (TNX=TN1-TN10) is an interval start current $I_{LS}(TNX)$, it is possible to ensure the similarity in the whole waveform of the $I_L$ current by performing the ON/OFF switching control at the interval TNX based on the switching pattern and setting a cycle length of the interval TNX to keep a positive/negative relationship between the interval start currents $I_{LS}(TNX)$ at each interval TNX.

Figure 21:
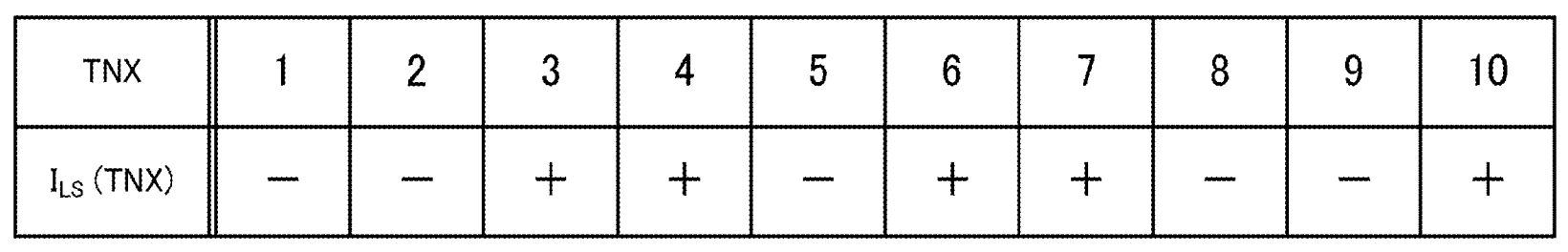

In the example of the $I_L$ current waveform shown in FIG. 20, as shown in FIG. 21, interval start currents $I_{LS}(TN1)$, $I_{LS}(TN2)$, $I_{LS}(TN5)$, $I_{LS}(TN8)$, and $I_{LS}(TN9)$ at the respective intervals TN1, TN2, TN5, TN8, and TN9 may be negative values (−) and interval start currents $I_{LS}(TN3)$, $I_{LS}(TN4)$, $I_{LS}(TN6)$, $I_{LS}(TN7)$, and $I_{LS}(TN10)$ at the respective intervals TN3, TN4, TN6, TN7, and TN10 other than the above intervals may be positive values (+). Note that the interval start current $I_{LS}(TNX)$ is any of the positive value and the negative value, and is not zero. By performing the ON/OFF switching control based on the switching pattern while satisfying the current direction condition of the interval start current $I_{LS}(TNX)$ at the interval TNX, the similarity of the whole $I_L$ current waveform is ensured, and it is possible to prevent the arm punch through of the whole DC-DC converter 1 throughout the entire one cycle.

Further, regarding each interval of the switching pattern, in viewpoint of a function, intervals that substantially contribute to power transmission between the primary side and the secondary side via the transformer 12 are intervals TN2-TN4 and TN7-TN9. Intervals other than the above intervals can be simply connection adjusting intervals in the $I_L$ current direction. That is, a relationship between the cycle lengths of the intervals TN2, TN3, TN4, TN7, TN8, and TN9 that determine the positive or negative (direction) of the $I_L$ current is important for satisfying the similar condition in the whole $I_L$ current waveform.

Furthermore, as the property required to the $I_L$ current waveform, it is assumed that the $I_L$ current makes the positive power applied to the transformer 12 equal to the negative power applied thereto to keep the neutrality without storing electromagnetic energy to the transformer 12 during the control cycle. That is, as shown in FIG. 20, the $I_L$ current waveform has an AC waveform with which power (area of the background with vertical lines in the drawing) applied to the transformer 12 while the $I_L$ current is a positive value is equal to power (area of the shaded background in the drawing) applied to the transformer 12 while the $I_L$ current is a negative value. Therefore, it is assumed that a waveform (a part of a solid line in the drawing) at the intervals TN1-TN5 and a waveform (a part of a dot-and-dash line in the drawing) at the intervals TN6-TN10 are line-symmetrical (inversely symmetrical in positive and negative) with respect to an axis line of $I_L$ current=0 with a phase shifted by a ½ cycle.

On the basis of the prerequisite elements of the $I_L$ current waveform described above, a description is given of a method for setting cycle lengths at each interval to satisfy the current direction condition in FIG. 21. Here, a description is given of an adjusting method of the cycle lengths at the respective intervals TN2 and TN4 by exemplifying the $I_L$ current waveform at the intervals TN1-TN5. Regarding adjustment of the cycle lengths of the intervals TN 7 and TN 9 of the remaining intervals TN6-TN10, the cycle length of the interval TN2 may be the same as that of the terminal TN4 or the positive/negative (direction) of the $I_L$ current may be reversed based on the prerequisite elements of the $I_L$ current waveform, and a similar method may be applied with a phase shifted by a ½ cycle.

8. Four Conditional Formulae Based on Geometric Shapes of $I_L$ Current Waveform Firstly, in order to satisfy the current direction condition, the following four conditional formulae may be simultaneously satisfied for the interval start current $I_{LS}(TNX)$ at the interval TNX.

$$I_{LS}(TN6)-I_{LS}(TN2)>0 \qquad \text{Formula 1}$$

$$I_{LS}(TN3)-I_{LS}(TN2)>(I_{LS}(TN6)-I_{LS}(TN2))/2 \qquad \text{Formula 2}$$

$$I_{LS}(TN4)-I_{LS}(TN2)>(I_{LS}(TN6)-I_{LS}(TN2))/2 \qquad \text{Formula 3}$$

$$I_{LS}(TN5)-I_{LS}(TN2)<(I_{LS}(TN6)-I_{LS}(TN2))/2 \qquad \text{Formula 4}$$

The conditional formula 1 can be rewritten as follows.

$$I_{LS}(TN6)>I_{LS}(TN2)$$

That is, the conditional formula 1 prescribes a magnitude relationship between $I_{LS}(TN6)$ and $I_{LS}(TN2)$. The DC-DC converter 1 transmits power to the secondary side from the primary side via the transformer 12. Therefore, the $I_L$ current waveform is an AC waveform alternately having a peak waveform and a trough waveform. As described above, intervals substantially contributing to the power transmission between the primary side and the secondary side are intervals TN2-TN4 and TN7-N9. Considering the reverse symmetry of positive and negative of the prescribing elements at the intervals TN2-TN4 and TN7-TN9, $I_{LS}(TN6)$ and $I_{LS}$ (TN2) have an equal absolute value with reverse signs (positive/negative). If the conditional formula 1 is satisfied, that is, $I_{LS}(TN2)$ is a negative value and $I_{LS}(TN6)$ is a positive value and the $I_L$ current is changed with time in a peak waveform (waveform changing from a negative value to a positive value and, subsequently, a negative value) shown in FIG. 22 at intervals TN2-TN4.

Subsequently, in the conditional formula 2, the left side corresponds to a relative difference II in FIG. 22, the right side corresponds to a relative difference I, and the magnitudes of the two relative differences I and II are compared with each other. The relative difference II is a relative difference value (positive value) of the $I_{LS}(TN3)$ to the $I_{LS}(TN2)$, corresponding to a level difference between $I_{LS}(TN2)$ and $I_{LS}(TN3)$ at the $I_L$ current waveform shown in the drawing. The relative difference I is an absolute value (positive value) of $I_{LS}(TN2)$, corresponding to a level difference between an axis line of $I_L$ current=0 in the $I_L$ current waveform in the drawing and $I_{LS}(TN2)$. If the conditional formula 1 is satisfied, $I_{LS}(TN2)$ is a negative value, and the relative difference II is larger than the relative difference I to satisfy the conditional formula 2, $I_{LS}(TN3)$ is necessarily a positive value.

Next, in the conditional formula 3, the magnitude of the relative difference I is compared with that of the relative difference III. With the similar reason to that in the conditional formula 2, if the conditional formula 3 is satisfied and the relative difference III is larger than the relative difference I, $I_{LS}(TN4)$ is necessarily a positive value. Since $I_{LS}(TN2)$ can be difference from $I_{LS}(TN3)$ depending on a magnitude relationship between VB and VPN, the conditional formula 3 is arranged separately from the conditional formula 2.

Subsequently, in the conditional formula 4, the left side corresponds to the relative difference IV in FIG. 22, the right side corresponds to the relative difference I, and the magnitudes of the two relative differences I and IV are compared with each other. The relative difference IV is a relative difference value (positive value) of $I_{LS}(TN5)$ to $I_{LS}(TN2)$, corresponding to a level difference between the $I_{LS}(TN2)$ and $I_{LS}(TN5)$ in the $I_L$ current waveform shown in the diagram. If the conditional formula 1 is satisfied, $I_{LS}(TN2)$ is a negative value, the conditional formula 4 is satisfied, and the relative difference IV is smaller than the relative difference I, $I_{LS}(TN5)$ is necessarily a negative value.

Here, it is assumed that a voltage applied to the inductance element 13 is V, an inductance constant of the inductance element 13 is L, and a time length is t. In this case, the amount of change of the $I_L$ current for the time length t is represented by Vt/L. As a result, a cycle length at the interval TNX is M(TNX), and the four conditional formulae 1 to 4 are thus rewritten as follows.

$$VB \times M(TN2)+(VB-VPN) \times M(TN3)-VPN \times M(TN4)+ \\ (VB+VPN) \times M(TN5)>0 \qquad \text{Formula 5}$$

$$VB \times M(TN2)>\{(VB \times M(TN2)+(VB-VPN) \times M(TN3)- \\ VPN \times M(TN4)+(VB+VPN) \times M(TN5)\}/2 \qquad \text{Formula 6}$$

$$VB \times M(TN2)+(VB-VPN) \times M(TN3)>\{(VB \times M(TN2)+ \\ (VB-VPN) \times M(TN3)-VPN \times M(TN4)+(VB+VPN) \times \\ M(TN5)\}/2 \qquad \text{Formula 7}$$

$$VB \times M(TN2)+(VB-VPN) \times M(TN3)-VPN \times M(TN4)<\{ \\ (VB \times M(TN2)+(VB-VPN) \times M(TN3)-VPN \times M \\ (TN4)+(VB+VPN) \times M(TN5)\}/2 \qquad \text{Formula 8}$$

Further, the conditional formulae 5 to 8 are adjusted, for M(TN2). Replacement is possible as follows.

$$M(TN2)>VPN \times M(TN4)/VB-(VB+VPN) \times M(TN5)/VB- \\ (VB-VPN) \times M(TN3)/VB \qquad \text{Formula 9}$$

$$M(TN2)>-VPN \times M(TN4)/VB+(VB+VPN) \times M(TN5)/ \\ VB+(VB-VPN) \times M(TN3)/VB \qquad \text{Formula 10}$$

$$M(TN2) > -VPN \times M(TN4)/VB + (VB+VPN) \times M(TN5)/VB - (VB-VPN) \times M(TN3)/VB \qquad \text{Formula 11}$$

$$M(TN2) < VPN \times M(TN4)/VB + (VB+VPN) \times M(TN5)/VB - (VB-VPN) \times M(TN3)/VB \qquad \text{Formula 12}$$

The four conditional formulae 9 to 12 based on geometric analysis of the $I_L$ current waveform as mentioned above are simultaneously satisfied, thereby satisfying the current direction condition shown in FIG. 21 at least at the intervals TN2-TN5. Further, as described above, at the other interval TN1, the connection of the $I_L$ current direction is adjusted and the current during the interval is definite. Therefore, the conditional formulae 1 to 4 are simultaneously satisfied, thereby satisfying the current direction condition shown in FIG. 21 at the whole intervals TN1-TN4. That is, by setting the cycle length M (TN1-TN5) of the intervals TN1-TN5 to satisfy the four conditional formulae 9 to 12, the current direction condition is satisfied, the similarity in the whole $I_L$ current waveform is ensured, and the arm punch through in the whole DC-DC converter 1 is prevented.

9. Example of Adjusting Method of Cycle Length of Intervals TN2 and TN4

As described above, there is an important relationship between the cycle lengths M(TN2) and M(TN4) of the respective intervals TN2 and TN4 to affect an influence on the control of the $I_L$ current direction. Herein, FIG. 23 shows examples of the cycle lengths M(TN2) and M(TN4) when operating a plurality of DC-DC converters 1 with different output power under a predetermined condition. In a graph shown in FIG. 23, the axis of abscissas corresponds to the cycle length M(TN4) of the interval TN4, and the axis of ordinate corresponds to the cycle length M(TN2) of the interval TN2. In the example shown in FIG. 23, there is a proportional relationship between the cycle lengths M(TN2) and M(TN4) in accordance with the change of increase/decrease of the output power of the DC-DC converter 1.

Further, in the graph in FIG. 23, an area of an inequality that simultaneously satisfies the four conditional formulae 9 to 12 is shown with dot hatching area in the diagram. Note that the cycle lengths M(TN3) and M(TN5) other than the cycle lengths M(TN2) and M(TN4) of the two axes are fixed with proper values, respectively. In the example shown in FIG. 23, when the output power is low (0.1 kw in the example), the cycle lengths M(TN3) and M(TN5) are out of the area for simultaneously satisfying the conditional formulae 1 to 4.

On the other hand, in the present embodiment, a lower limit value of the change of increase/decrease of the cycle length M(TN2) at the interval TN2 is set, for example, thereby ensuring the simultaneous establishment of the conditional formulae 1 to 4. As shown in FIG. 24 corresponding to FIG. 23, for example, the cycle length M(TN2) corresponding to an intersection point IP of an inequality boundary linear line between the conditional formulae 2 and 4 or the conditional formulae 3 and 4 for the coordinate axis (axis of ordinate) of the cycle length M(TN2), is set as a lower limit value of reduction (approximately 1.7 µs in the shown example) of the cycle length M(TN2). As a result, the cycle length M(TN2) can be included within the area for simultaneously satisfying the conditional formulae 1 to 4 with the DC-DC converter 1 at any output power, and the arm punch through can be prevented in the entire DC-DC converter 1.

Note that the lower limit value is set to the cycle length M(TN2). Alternatively, other methods may be used, e.g., a lower limit value is set to the cycle length M(TN4). That is, any method may be used for including the plotting in the cycle lengths M(TN2) and M(TN4) of the DC-DC converter 1 within the area for simultaneously satisfying the conditional formulae 1 to 4.

10. Correction of Conditional Formulae

The four conditional formulae 9 to 12 as described above are guided directly from the relational formulae between the interval start currents $I_{LS}(TNX)$ at each interval based on a geometrical shape of the $I_L$ current waveform. Further, proper correction may be performed according to necessity. For example, in the case that the SJMOSFET is used for the switching elements Q1-Q8, it can be necessary that a certain or more element current $I_Q$ flows in the forward direction for reverse recovery. Furthermore, with an actual device, in consideration of variation or the like in inductance constants of the inductance element 13, it is preferable to provide a design margin to the cycle length M(TNX) at the interval TNX. From these reasons, not only the current direction of the start current $I_{LS}(TNX)$ at the interval may be controlled but also the lower limit value of the start current $I_{LS}(TNX)$ at the interval to be ensured at the lowest level may be set. In the case that the current of the lower limit value is $I_{MIN}$, in the respective conditional formulae 9, 10, and 12, $2 \times I_{MIN} \times L/VB$ can be corrected as an additional index as follows.

$$M(TN2) > VPN \times M(TN4)/VB - (VB+VPN) \times M(TN5)/VB - (VB-VPN) \times M(TN3)/VB + 2 \times I_{MIN} \times L/VB \qquad \text{Formula 9'}$$

$$M(TN2) > -VPN \times M(TN4)/VB + (VB+VPN) \times M(TN5)/VB + (VB-VPN) \times M(TN3)/VB + 2 \times I_{MIN} \times L/VB \qquad \text{Formula 10'}$$

$$M(TN2) < VPN \times M(TN4)/VB + (VB+VPN) \times M(TN5)/VB - (VB-VPN) \times M(TN3)/VB - 2 \times I_{MIN} \times L/VB \qquad \text{Formula 12'}$$

11: Functional Configuration of Command Generator

Next, a description will be given of an exemplary functional configuration of the command generator 21 with reference to FIG. 25. As shown in FIG. 25, the command generator 21 includes: a duration calculator 41; and a switch timing controller 42. The switch timing controller 42 includes: a first switch timing controller 43; a second switch timing controller 44; and a third switch timing controller 45.

The duration calculator 41 calculates the cycle length M(TNX) at the interval TNX of the switching pattern based on three elements of an input voltage, an output voltage, and an output power as operational parameters of the DC-DC converter 1 described above. Specifically, the duration calculator 41 determines the $I_L$ current waveform based on the input voltage and the output voltage, and similarly changes the $I_L$ current waveform based on the output voltage (by changing the amplitude and the cycle length). The calculation may be performed based on a predetermined operational formula or a correlation table that is prepared in advance.

The switch timing controller 42 controls the switching timing at the interval TNX of the switching pattern, thereby adjusting the cycle length M(TNX) at the interval TNX calculated by the duration calculator 41 so as to simultaneously satisfy the four conditional formulae 9-12. As a specific method of the adjustment, the lower limit value of the cycle length M(TN2) as described above is set.

That is, the switch timing controller 42 controls the switch driver 23 to switch among a first switching pattern (switching patterns at the intervals TN3 and TN8), a second switching pattern (switching patterns at the intervals TN4, TN9, TN5, and TN10), and a third switching pattern (switching patterns at the intervals TN6 and TN1) at timing at which the current direction of the $I_L$ current flowing through the inductance element 13 is a predetermined direction (positive or negative). Specifically, as shown in FIG. 20, the switch timing controller 42 performs switching from the first switching pattern (at the interval TN3) to the second switching patterns (at the intervals TN4 and TN5) at timing when the $I_L$ current direction is positive, and further performs switching from the second switching patterns (at the intervals TN4 and TN5) to the third switching pattern (at the interval TN6). Furthermore, at timing at which the $I_L$ current direction is negative, the switch timing controller 42 performs switching from the first switching pattern (at the interval TN8) to the second switching patterns (at the intervals TN9 and TN10), and further performs switching from the second switching patterns (at the intervals TN9 and TN10) to the third switching pattern (at the interval TN1).

Moreover, the first switch timing controller 43 controls the switch driver 23 to perform switching from another switching pattern (switching patterns at the intervals TN2 and TN7) to the first switching pattern (switching patterns at the intervals TN3 and TN8) and further switching from the first switching pattern (switching patterns at the intervals TN3 and TN8) to the second switching pattern (switching patterns at the intervals TN4, TN9, TN5, and TN10) while the direction of a current flowing through the inductance element 13 is one (positive or negative) direction. Specifically, as shown in FIG. 20, the first switch timing controller 43 performs switching from another switching pattern (at the interval TN2) to the first switching pattern (at the interval TN3) and further switching from the first switching pattern (at the interval TN3) to the second switching patterns (at the intervals TN4 and TN5) while the $I_L$ current direction is positive. In addition, the first switch timing controller 43 performs switching from another switching pattern (at the interval TN7) to the first switching pattern (at the interval TN8) and further switching from the first switching pattern (at the interval TN8) to the second switching patterns (at the intervals TN9 and TN10) while the $I_L$ current direction is negative.

Further, the second switch timing controller 44 controls the switch driver 23 to perform switching from the second switching pattern (switching patterns at the intervals TN4, TN9, TN5, and TN10) to the third switching pattern (switching patterns at the intervals TN6 and TN1) and further switching from the third switching pattern (switching patterns at the intervals TN6 and TN1) to other switching patterns (switching patterns at the intervals TN2 and TN7) while the direction of a current flowing through inductance element 13 is one (positive or negative) direction. Specifically, as shown in FIG. 20, the second switch timing controller 44 performs switching from the second switching pattern (at the intervals TN4 and TN5) to the third switching pattern (at the interval TN6) and further switching from the third switching pattern (at the interval TN6) to another switching pattern (at the interval TN7) while the $I_L$ current direction is positive. In addition, the second switch timing controller 44 performs switching from the second switching pattern (at the intervals TN9 and TN10) to the third switching pattern (at the interval TN1) and further switching from the third switching pattern (at the interval TN1) to another switching patterns (at the interval TN2) while the $I_L$ current direction is negative.

Furthermore, the third switch timing controller 45 controls the switch driver 23 to perform switching from the fourth switching pattern (switching patterns at the intervals TN4 and TN9) to the fifth switching pattern (switching patterns at the intervals TN5 and TN10) at timing at which the direction of a current flowing through the inductance element 13 is the other (negative or positive) direction. Specifically, as shown in FIG. 20, the third switch timing controller 45 performs switching from the fourth switching pattern (at the interval TN4) to the fifth switching pattern (at the interval TN5) at timing at which the $I_L$ current direction is negative. Further, the third switch timing controller 45 performs switching from the fourth switching pattern (at the interval TN9) to the fifth switching pattern (at the interval TN10) at timing at which the $I_L$ current direction is positive.

Note that the processing by the duration calculator 41 and the switch timing controller 42 as described above is not limited to the sharing example of the processing and may be performed by a further smaller number of processing units (e.g., one processing unit). In addition, the processing may be performed by a further-divided processing unit. Furthermore, the controller 20 including the command generator 21 may be loaded by a program executed by a CPU 901 (refer to FIG. 26), which will be described later, or a part or all may be loaded by ASIC or FPGA or an actual device such as another electrical circuit.

12: Exemplary Hardware Configuration of Controller

An exemplary hardware configuration will be described for the controller 20 achieving the processes of each of the switching pattern controllers 24-28 of the switch driver 23, the switch timing controller 42 of the command generator 21, etc. implemented by a program executed by the CPU 901 described above, with reference to FIG. 26.

As shown in FIG. 26, the controller 20 has, for example, a CPU 901, a ROM 903, a RAM 905, a dedicated integrated circuit 907 constructed for specific use such as an ASIC or an FPGA, an input device 913, an output device 915, a storage device 917, a drive 919, a connection port 921, and a communication device 923. These constituent elements are mutually connected via a bus 909 and an I/O interface 911 such that signals can be transferred.

The program can be recorded in the ROM 903, the RAM 905, and the storage device 917, for example.

The program can also temporarily or permanently be recorded in a removable recording medium 925 such as magnetic disks including flexible disks, various optical disks including CDs, MO disks, and DVDs, and semiconductor memories. The removable recording medium 925 as described above can be provided as so-called packaged software. In this case, the program recorded in the removable recording medium 925 may be read by the drive 919 and recorded in the storage device 917 through the I/O interface 911, the bus 909, etc.

The program may be recorded in, for example, a download site, another computer, or another recording device (not shown). In this case, the program is transferred through a network NW such as a LAN and the Internet and the communication device 923 receives this program. The program received by the communication device 923 may be recorded in the storage device 917 through the I/O interface 911, the bus 909, etc.

The program may be recorded in appropriate externally-connected equipment 927, for example. In this case, the program may be transferred through the appropriate connection port 921 and recorded in the storage device 917 through the I/O interface 911, the bus 909, etc.

The CPU 901 executes various process in accordance with the program recorded in the storage device 917 to implement the processes of each of the switching pattern controllers 24-28 of the switch driver 23, the switch timing controller 42 of the command generator 21, etc. In this case, the CPU 901 may directly read and execute the program from the storage device 917 or may be execute the program once loaded in the RAM 905. In the case that the CPU 901 receives the program through, for example, the communication device 923, the drive 919, or the connection port 921, the CPU 901 may directly execute the received program without recording in the storage device 917.

The CPU 901 may execute various processes based on a signal or information input from the input device 913 such as a mouse, a keyboard, and a microphone (not shown) as needed.

The CPU 901 may output a result of execution of the process from the output device 915 such as a display device and a sound output device, for example, and the CPU 901 may transmit this process result through the communication device 923 or the connection port 921 as needed or may record the process result into the storage device 917 or the removable recording medium 925.

13: Effect of the Embodiment

As described above, with the DC-DC converter 1 of the present embodiment, the switch driver 23 in the controller 20 includes: the first switching pattern controller 24 that executes the switching pattern at the interval TN(X−3) at which the element current $I_Q$ in the reverse direction flows through the lower arm switching element $Q_L$ (or upper arm switching element $Q_H$) and the upper arm switching element $Q_H$ (or lower arm switching element $Q_L$) is in the OFF state; the second switching pattern controller 25 that executes the switching patterns at the intervals TN(X−2) and TN(X−1) at which the direction of the element current $I_Q$ flowing through the lower arm switching element $Q_L$ (or upper arm switching element $Q_H$) is switched from the reverse direction to the forward direction; and the third switching pattern controller 26 that executes the switching pattern at the interval TNX at which the lower arm switching element $Q_L$ (or upper arm switching element $Q_H$) is in the OFF state and the upper arm switching element $Q_H$ (or lower arm switching element $Q_L$) is in the ON state.

As a result, the switch driver 23 executes the switching patterns at the intervals TN(X−2) and TN(X−1) at proper timing, thereby enabling the switching to the element current $I_Q$ in the forward direction before setting, to the OFF state, the lower arm switching element $Q_L$ (or upper arm switching element $Q_H$) through which the element current $I_Q$ in the reverse direction flows. As a result, a depletion layer is formed in a parasitic diode 32 of the SJMOSFET, thereby suppressing the generation of the recovery current $I_R$. As described above, it is possible to use the SJMOSFET also for a switching circuit to which a current flows through the parasitic diode 32 without using a resonant circuit or the like. That is, the loss due to the recovery current can be reduced. Therefore, it is possible to realize a power conversion device that can use the MOSFET with the superjunction structure. Further, in the case that the recovery current $I_R$ flows so as to punch through the whole arm, this is a factor for generating voltage surge. However, in the present embodiment, it is possible to suppress the generation of the recovery current $I_R$ and thus to reduce the surge.

Further, in the present embodiment, the second switching pattern controller 25 executes the switching patterns at the intervals TN(X−2) and TN(X−1) between the switching pattern at the interval TN(X−3) executed by the first switching pattern controller 24 and the switching pattern at the interval TNX executed by the third switching pattern controller 26. As a result, the switch driver 23 can switch the current to the element current $I_Q$ in the forward direction before setting, to the OFF state, the lower arm switching element $Q_L$ (or upper arm switching element $Q_H$) through which the element current $I_Q$ in the reverse direction flows. Therefore, a depletion layer is formed in the parasitic diode 32 of the SJMOSFET, and the generation of the recovery current $I_R$ can be suppressed.

Furthermore, in the present embodiment, in particular, the second switching pattern controller 25 includes a fourth switching pattern controller 27 that executes a switching pattern at the interval TN(X−2) to be set that the combination of the ON/OFF state of the whole plurality of arm switching elements Q1-Q8 is in a predetermined state different from the switching pattern at the interval TN(X−3) and the predetermined state is kept until the direction of the element current $I_Q$ flowing through the lower arm switching element $Q_L$ (or upper arm switching element $Q_H$) is switched to the forward direction from the reverse direction.

The switching pattern at the interval TN(X−2) is obtained by separating the primary side winding of the transformer 12 and the inductance element 13 in the DC-DC converter 1 from the input side DC bus bar and connecting the secondary side winding of the transformer 12 and an output side DC bus bar. At this time, a voltage with a magnitude equal to a voltage V2 on the secondary side of the transformer 12 is applied to the inductance element 13 because of V1=0. As a result, in the case of the winding ratio N=1, the $I_L$ current is changed based on a relationship of L×dIL/dt=−V2, and the direction of the element current $I_Q$ of the switching elements Q1-Q8 is reversed in the switching circuits 10 and 11 on the primary and secondary sides of the transformer 12.

Therefore, with a simple method that the pattern is not shifted to a next pattern until the direction of the element current $I_Q$ flowing through the lower arm switching element $Q_L$ (or upper arm switching element $Q_H$) is switched to the forward direction from the reverse direction by using the conventionally-used switching pattern in the operation example of the comparative example, the element current $I_Q$ in the forward direction can flow through the lower arm switching element $Q_L$ (or upper arm switching element $Q_H$) without setting a new switching pattern.

Further, in the present embodiment, in particular, the second switching pattern controller 25 includes the fifth switching pattern controller 28 that executes a switching pattern at the interval TN(X−1) set to reverse the direction of a current flowing through the windings on the secondary side of the transformer 12 from the last state of the switching pattern at the interval TN(X−2).

In the case of controlling operations of the lower arm switching element $Q_L$ and the upper arm switching element $Q_H$ with the switching pattern at the interval TN(X−2), it is possible to suppress the generation of the recovery current $I_R$ in the arm including the upper arm and lower arm switching elements $Q_L$ and $Q_H$. However, the recovery current $I_R$ of other arms may flow through the whole arms to cause loss (at, e.g., intervals T2 and T6 of the first arm having the switching elements Q1 and Q2 shown in FIG. 15).

By controlling the lower arm and upper arm switching elements $Q_L$ and $Q_H$ with the switching pattern at the interval TN(X−1), the generation of the recovery current $I_R$ in another arm can also be suppressed. Therefore, it is possible to suppress the loss in the whole switching circuits 10 and 11.

Furthermore, in the present embodiment, in particular, the switch driver 23 controls the operations of the arm switching elements Q1-Q8 based on the switching pattern at the interval TN(X-3), the switching patterns at the intervals TN(X-2) and TN(X-1), and the switching pattern at the interval TNX to one arm. Further, the switch driver 23 controls the operations of the arm switching elements Q1-Q8 based on the switching pattern at the interval TN(X-3), the switching patterns at the intervals TN(X-2) and TN(X-1), and the switching pattern at the interval TNX to at least one arm other than the one arm.

That is, in the switching circuits 10 and 11 having a plurality of arms, having the lower arm switching element $Q_L$ and the upper arm switching element $Q_H$ respectively, the control is performed with the switching pattern at the intervals TN(X-3)-TNX to one arm, thereby suppressing the generation of the recovery current $I_R$ in the one arm. However, in other arms, the recovery current $I_R$ may flow through the whole arms to cause the loss.

Specifically, with the switching pattern shown in FIG. 15, for example, the fourth arm is controlled at an interval T3 (example of the first switching pattern), an interval T4$_L$ (example of the second switching pattern), and an interval T5 (example of the third switching pattern), thereby preventing the generation of the arm punch through (refer to FIG. 3) of the recovery current at the interval T5. However, a similar phenomenon is generated at the interval T6 in the first arm. Similarly, the fourth arm is controlled at an interval T7 (example of the first switching pattern), an interval T8$_L$ (example of the second switching pattern), and an interval T1 (example of the third switching pattern), thereby preventing the generation of the arm punch through (refer to FIG. 3) of the recovery current at the interval T1. However, a similar phenomenon is generated at the interval T2 in the first arm.

In the present embodiment, the switch driver 23 also controls at least one arm other than the one arm with the switching patterns at intervals TN(X-3)-TNX, thereby suppressing the generation of the recovery current $I_R$ in other arms. Therefore, it is possible to suppress the loss of the whole switching circuits 10 and 11.

Specifically, with a switching pattern shown in FIG. 17, for example, the first arm is controlled at an interval TN4 (example of the first switching pattern), intervals TN5 and TN6 (examples of the second switching pattern), and an interval TN7 (example of the third switching pattern), thereby preventing the generation of the arm punch through of the recovery current at the interval TN7 (corresponding to the interval T6 in FIG. 15). Similarly, the first arm is controlled at an interval TN9 (example of the first switching pattern), intervals TN10 and TN1 (example of the second switching pattern), and an interval TN2 (example of the third switching pattern), thereby preventing the generation of the arm punch through of the recovery current at the interval TN2 (corresponding to the interval T2 in FIG. 15).

Further, in the present embodiment, in particular, the DC-DC converter 1 includes: the first switching circuit 10 having two arms, including the lower arm switching elements Q2 and Q4 and the upper arm switching elements Q1 and Q3 respectively; and the second switching circuit 11 having two arms, including the lower arm switching elements Q6 and Q8 and the upper arm switching elements Q5 and Q7 respectively. Further, the DC-DC converter 1 includes: the transformer 12 that is arranged between the AC side of the first switching circuit 10 and the AC side of the second switching circuit 11; and the inductance element 13 that is arranged between the transformer 12 and at least one AC side of the first switching circuit 10 and the second switching circuit 11.

In the DC-DC converter 1 of the present embodiment, the two switching circuits 10 and 11 are connected via the inductance elements 13 and the transformer 12. In addition, an operation method with the switching pattern described above is used. As a result, it is possible to realize the DC-DC converter using the SJMOSFET while suppressing costs.

Furthermore, in the present embodiment, in particular, the lower arm switching elements $Q_L$ and the upper arm switching element $Q_H$, i.e., the lower arm switching elements Q2, Q4. Q6, and Q8 and the upper arm switching elements Q1, Q3, Q5, and Q7 are MOSFETs with the super-junction structure. The forward direction of the element current $I_Q$ is a direction from a drain electrode to a source electrode, and the reverse direction of the element current $I_Q$ is a direction from the source electrode to the drain electrode.

The SJMOSFET is used for the lower arm switching element $Q_L$ and the upper arm switching element $Q_H$, thereby greatly reducing conductive resistance of the switching element and improving the power converting efficiency. Further, the price of SJMOSFET is lower than that of a wide band gap semiconductor such as GaN or SiC. Therefore, in the case of using the SJMOSFET as a replacement, it is advantageous in viewpoint of a merit of costs.

Moreover, in the present embodiment, in particular, the DC-DC converter 1 includes: the first switching circuit 10 having one two arms, including the upper arm switching element $Q_H$ and the lower arm switching element $Q_L$ respectively; and the second switching circuit 11 having the other two arms, including the upper arm switching element $Q_H$ and the lower arm switching element $Q_L$ respectively. The DC-DC converter 1 includes: the transformer 12 that is arranged between the AC side of the first switching circuit 10 and the AC side of the second switching circuit 11; the inductance element 13 that is arranged between the transformer 12 and the AC side of at least one of the first switching circuit 10 and the second switching circuit 11; and the command generator 21 that generates a control command and outputs the command to the switch driver 23. The command generator 21 includes a switch timing controller 42 that controls the switch driver 23 to switch among the first switching pattern, the second switching pattern, and the third switching pattern at timing at which a current direction of the $I_L$ current flowing through the inductance element 13 is a predetermined direction (positive or negative).

As a result, the switching of the first switching pattern, the second switching pattern, and the third switching pattern is performed at timing at which the direction of the $I_L$ current flowing through the inductance element 13 is a predetermined direction, thereby ensuring a control function of the $I_L$ current direction with the second switching pattern. As a result, it is possible to improve the certainty to switch the direction of the $I_Q$ current flowing through the upper arm switching element $Q_H$ or the lower arm switching element $Q_L$ at an interval of the second switching pattern from the reverse direction to the forward direction, thereby suppressing the loss due to the recovery current.

Further, in the present embodiment, in particular, the switch timing controller 42 includes the first switch timing controller 43 that controls the switch driver 23 that performs the switching from another switching pattern to the first switching pattern and the switching from the first switching pattern to the second switching pattern at timing at which the current direction of the $I_L$ current flowing through the inductance element 13 is one direction (positive or negative).

As a result, it is possible to set the interval of the first switching pattern to an interval at which the $I_L$ current of the inductance element 13 is in the positive (or negative) direction, i.e., an interval at which both the primary side AC voltage and the secondary side AC voltage are positive (or negative). Therefore, the power converting efficiency is improved.

Furthermore, in the present embodiment, in particular, the switch timing controller 42 includes the second switch timing controller 44 that controls the switch driver 23 to perform the switching from the second switching pattern to the third switching pattern and the switching from the third switching pattern to another switching pattern at timing at which the current direction of the $I_L$ current flowing through the inductance element 13 is one direction (positive or negative).

As a result, it is possible to set the interval of the third switching pattern to an interval at which the $I_L$ current of the inductance element 13 is in the positive (or negative) direction, similar to the interval of the first switching pattern. That is, with the second switching pattern, the current direction of the $I_L$ current is reversed from one direction to the other direction and is thereafter reversed from the other direction to the one direction again. That is, the zero-crossing operation is performed twice. As a result, it is possible to prevent the generation of the arm punch through of the recovery current at any interval in any of the plurality of arms in the DC-DC converter 1.

Moreover, in the present embodiment, in particular, the second switching pattern is in a predetermined state in which the ON/OFF state of at least one of the plurality of switching elements Q1-Q8 is different from that of the first switching pattern, and includes: a fourth switching pattern that is set to keep a predetermined state until the current direction of the $I_Q$ current flowing through the upper arm switching element $Q_H$ or the lower arm switching element $Q_L$ is switched from the reverse direction to the forward direction; and a fifth switching pattern that is set to reverse the current direction of the $I_L$ current flowing through the inductance element 13 from the last state of the fourth switching pattern. The switch timing controller 42 includes the third switch timing controller 45 that controls the switch driver 23 to perform the switching from the fourth switching pattern to the fifth switching pattern at timing at which the current direction of the $I_L$ current flowing through the inductance element 13 is the other direction (negative or positive).

As a result, it is possible to reverse the current direction of the $I_L$ current flowing through the inductance element 13 at the interval of the fourth switching pattern from one direction to another direction, and to reverse the current direction of the $I_L$ current flowing through the inductance element 13 from the other direction to the one direction at the interval of the fifth switching pattern. As a result, it is possible to ensure the control function of the $I_Q$ current direction with the fourth switching pattern and the fifth switching pattern, and it is thus possible to suppress the loss due to the recovery current.

14: Modification

Note that, in the present embodiment, the description is given of the case of using the SJMOSFET 31 potentially having the parasitic diode 32 with high recovery current for the switching elements Q1-Q8. However, the disclosure is not limited to this. For example, the driving control with the switching pattern in the embodiment is also advantageous to the case of using an SJMOSFET in which a so-called fly wheel diode is externally connected in parallel or insulated gate bipolar transistor (IGBT) (not shown) for the switching elements Q1-Q8, and using a FET not having the super-junction structure, and a similar advantage is obtained. In this case, both various FETs or IGBTs and the externally attached diode correspond to the switching element in the present embodiment.

Further, in the above, as an example of the power conversion device having the switching pattern in the present embodiment, the DC-DC converter for DC power conversion is described. However, the present disclosure is not limited to this, and can be applied to a device that performs frequency conversion and the like from AC to DC or from DC to AC (inverter).

Techniques by the embodiment and each modified example may be appropriately combined and utilized in addition to the examples having already described above. Although exemplification is not performed one by one, the embodiment and each modified example are carried out by various changes being applied thereto without departing from the technical idea of the present disclosure. Obviously, numerous modifications and variations of the present disclosure are possible in light of the above teachings. It is therefore to be understood that within the scope of the appended claims, the disclosure may be practiced otherwise than as specifically described herein.

What is claimed is:

1. A power conversion device, comprising:
   a first switching circuit comprising two arms each comprising a first switching element and a second switching element such that the first switching element and the second switching element are electrically coupled in series;
   a second switching circuit comprising two arms each comprising a first switching element and a second switching element such that the first switching element and the second switching element are electrically coupled in series;
   a transformer electrically coupled between an AC side of the first switching circuit and an AC side of the second switching circuit;
   an inductance element electrically coupled between an AC side of at least one of the first switching circuit and the second switching circuit and the transformer; and
   a switch driver comprising circuitry configured to execute a first switching pattern set such that a current in a reverse direction flows through the first switching element and the second switching element is off, execute a second switching pattern set such that a direction of the current flowing through the first switching element is switched to a forward direction from the reverse direction, and execute a third switching pattern set such that the first switching element is off and the second switching element is on,
   wherein the second switching pattern includes a fourth switching pattern and a fifth switching pattern executed continuously without interposing any other switching pattern, the fourth switching pattern is set such that a direction of the current flowing through the inductance element is reversed from one direction to another direction while keeping a switching state of all of the first switching elements and the second switching elements of the first switching circuit and the second switching circuit, and the fifth switching pattern is set such that a direction of the current flowing through the inductance element is reversed from the other direction which is a last state of the fourth switching pattern to the one direction while keeping a switching state of all of the first switching elements and the second switching elements of the first switching circuit and the second switching circuit.

2. The power conversion device according to claim 1, wherein the circuitry of the switch driver comprises first switching pattern controller circuitry configured to execute the first switching pattern, second switching pattern controller circuitry configured to execute the second switching pattern, and third switching pattern controller circuitry configured to execute the third switching pattern, and the second switching pattern controller circuitry is configured to execute the second switching pattern between the first switching pattern executed by the first switching pattern controller circuitry and the third switching pattern executed by the third switching pattern controller circuitry.

3. The power conversion device according to claim 2, wherein the second switching pattern controller circuitry comprises fourth switching pattern controller circuitry configured to execute the fourth switching pattern.

4. The power conversion device according to claim 3, wherein the second switching pattern controller circuitry comprises fifth switching pattern controller circuitry configured to execute the fifth switching pattern.

5. The power conversion device according to claim 4, wherein the circuitry of the switch driver is configured to control operations of the first switching element and the second switching element for one arm of the arms based on the first switching pattern, the second switching pattern, and the third switching pattern, and control operations of the first switching element and the second switching element for at least one arm except for the one arm of the arms, based on the first switching pattern, the second switching pattern, and the third switching pattern.

6. The power conversion device according to claim 5, wherein each of the first switching element and the second switching element is a MOSFET having a super junction structure, and the forward direction is a direction from a drain to a source and the reverse direction is a direction from the source to the drain.

7. The power conversion device according to claim 6, further comprising:
  a command generator comprising command generator circuitry configured to generate a control command and output the control command to the switch driver, and the command generator circuitry comprises switch timing controller circuitry configured to control the switch driver to switch among the first switching pattern, the second switching pattern, and the third switching pattern at timing at which a direction of a current flowing through the inductance element is a predetermined direction.

8. The power conversion device according to claim 7, wherein the switch timing controller circuitry is configured to control the switch driver to perform switching to the first switching pattern from one of other switching patterns and switching from the first switching pattern to the second switching pattern at timing at which the direction of the current flowing through the inductance element is one direction.

9. The power conversion device according to claim 8, wherein the switch timing controller circuitry is configured to control the switch driver to perform switching from the second switching pattern to the third switching pattern and switching from the third switching pattern to one of the other switching patterns at timing at which the direction of the current flowing through the inductance element is one direction.

10. The power conversion device according to claim 9, wherein the switch timing controller circuitry is configured to control the switch driver to perform switching from the fourth switching pattern to the fifth switching pattern at timing at which the direction of the current flowing through the inductance element is another direction.

11. The power conversion device according to claim 1, further comprising:
  a command generator comprising command generator circuitry configured to generate a control command and output the control command to the switch driver,
  wherein the command generator circuitry comprises switch timing controller circuitry configured to control the switch driver to switch among the first switching pattern, the second switching pattern, and the third switching pattern at timing at which a direction of the current flowing through the inductance element is a predetermined direction.

12. The power conversion device according to claim 11, wherein the switch timing controller circuitry is configured to control the switch driver to perform switching to the first switching pattern from one of other switching patterns and switching from the first switching pattern to the second switching pattern at timing at which the direction of the current flowing through the inductance element is one direction.

13. The power conversion device according to claim 12, wherein the switch timing controller circuitry is configured to control the switch driver to perform switching from the second switching pattern to the third switching pattern and switching from the third switching pattern to one of the other switching patterns at timing at which the direction of the current flowing through the inductance element is one direction.

14. The power conversion device according to claim 13, wherein the switch timing controller circuitry is configured to control the switch driver to perform switching from the fourth switching pattern to the fifth switching pattern at timing at which the direction of the current flowing through the inductance element is another direction.

15. The power conversion device according to claim 1, wherein each of the first switching element and the second switching element is a MOSFET having a super junction structure, and the forward direction is a direction from a drain to a source and the reverse direction is a direction from the source to the drain.

16. The power conversion device according to claim 15, further comprising:
  a command generator comprising command generator circuitry configured to generate a control command and output the control command to the switch driver, and the command generator circuitry comprises switch timing controller circuitry configured to control the switch driver to switch among the first switching pattern, the second switching pattern, and the third switching pattern at timing at which a direction of the current flowing through the inductance element is a predetermined direction.

17. The power conversion device according to claim 2, wherein each of the first switching element and the second switching element is a MOSFET having a super junction structure, and the forward direction is a direction from a drain to a source and the reverse direction is a direction from the source to the drain.

18. The power conversion device according to claim 17, further comprising:
a command generator comprising command generator circuitry configured to generate a control command and output the control command to the switch driver, and the command generator circuitry comprises switch timing controller circuitry configured to control the switch driver to switch among the first switching pattern, the second switching pattern, and the third switching pattern at timing at which a direction of the current flowing through the inductance element is a predetermined direction.

19. A power conversion method executed by a power conversion device comprising a first switching circuit comprising two arms each comprising a first switching element and a second switching element such that the first switching element and the second switching element are electrically coupled in series, a second switching circuit comprising two arms each comprising a first switching element and a second switching element such that the first switching element and the second switching element are electrically coupled in series, a transformer electrically coupled between an AC side of the first switching circuit and an AC side of the second switching circuit, and an inductance element electrically coupled between an AC side of at least one of the first switching circuit and the second switching circuit and the transformer, the power conversion method comprising:
executing a first switching pattern which is set such that a current in a reverse direction flows through the first switching element and the second switching element is off;
executing a second switching pattern which is set such that a direction of the current flowing through the first switching element is switched to a forward direction from the reverse direction; and
executing a third switching pattern which is set such that the first switching element is off and the second switching element is on,
wherein the second switching pattern includes a fourth switching pattern and a fifth switching pattern executed continuously without interposing any other switching pattern, the fourth switching pattern is set such that a direction of the current flowing through the inductance element is reversed from one direction to another direction while keeping a switching state of all of the first switching elements and the second switching elements of the first switching circuit and the second switching circuit, and the fifth switching pattern is set such that a direction of the current flowing through the inductance element is reversed from the other direction which is a last state of the fourth switching pattern to the one direction while keeping a switching state of all of the first switching elements and the second switching elements of the first switching circuit and the second switching circuit.

20. The power conversion method according to claim 19, further comprising:
switching among the first switching pattern, the second switching pattern, and the third switching pattern at timing at which a direction of the current flowing through the inductance element is a predetermined direction.

* * * * *